(12) United States Patent
Imada

(10) Patent No.: US 11,353,645 B2
(45) Date of Patent: Jun. 7, 2022

(54) LIGHT-EMITTING MODULE INCLUDING FIRST HOLE PORTION

(71) Applicant: NICHIA CORPORATION, Anan (JP)

(72) Inventor: Mamoru Imada, Anan (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 17/189,198

(22) Filed: Mar. 1, 2021

(65) Prior Publication Data

US 2021/0270445 A1 Sep. 2, 2021

(30) Foreign Application Priority Data

Mar. 2, 2020 (JP) .............................. JP2020-035183
Dec. 4, 2020 (JP) .............................. JP2020-202010

(51) Int. Cl.
| | |
|---|---|
| *F21V 8/00* | (2006.01) |
| *F21V 9/30* | (2018.01) |
| *G02F 1/1335* | (2006.01) |
| *G02F 1/13357* | (2006.01) |
| *F21Y 105/16* | (2016.01) |

(52) U.S. Cl.
CPC .............. *G02B 6/0021* (2013.01); *F21V 9/30* (2018.02); *G02B 6/002* (2013.01); *G02B 6/0038* (2013.01); *G02B 6/0051* (2013.01); *G02B 6/0055* (2013.01); *G02B 6/0066* (2013.01); *G02B 6/0086* (2013.01); *G02F 1/133603* (2013.01); *G02F 1/133605* (2013.01); *G02F 1/133606* (2013.01); *G02F 1/133612* (2021.01); *F21Y 2105/16* (2016.08)

(58) Field of Classification Search
CPC ................ G02B 6/0021; G02B 6/0038; G02F 1/133612
See application file for complete search history.

(56) References Cited

U.S. PATENT DOCUMENTS

| | | | |
|---|---|---|---|
| 2002/0097578 A1 | 7/2002 | Greiner | |
| 2008/0137335 A1* | 6/2008 | Tsai ..................... | G02B 5/0247 362/247 |
| 2011/0090672 A1* | 4/2011 | Zhu ...................... | G02B 6/0021 362/97.1 |
| 2011/0149594 A1 | 6/2011 | Terajima et al. | |
| 2018/0239193 A1 | 8/2018 | Hayashi | |
| 2018/0335559 A1* | 11/2018 | Cho ..................... | G02B 6/0016 |

(Continued)

FOREIGN PATENT DOCUMENTS

| | | |
|---|---|---|
| JP | 2002231037 A | 8/2002 |
| JP | 2006227423 A | 8/2006 |

(Continued)

*Primary Examiner* — Keith G. Delahoussaye
(74) *Attorney, Agent, or Firm* — Hunton Andrews Kurth LLP

(57) ABSTRACT

A light-emitting module includes a two-dimensional array of a plurality of light-emitting units. Each of the light-emitting units includes a lightguide plate, a light source, and a light diffusing layer. The light guide plate has a first surface and a first hole portion. The first hole portion has at least one lateral surface and an opening at the first surface. The light source is provided at least partially inside the first hole portion. The light source includes a light-emitting element. The light diffusing layer covers part of the at least one lateral surface of the first hole portion.

17 Claims, 23 Drawing Sheets

(56) References Cited

U.S. PATENT DOCUMENTS

| | | | |
|---|---|---|---|
| 2020/0043903 A1 | 2/2020 | Kasai et al. | |
| 2020/0064687 A1 | 2/2020 | Imada | |
| 2020/0105973 A1 | 4/2020 | Kasai et al. | |
| 2020/0209462 A1 | 7/2020 | Kasai | |
| 2020/0379165 A1* | 12/2020 | Hayashi | G02B 6/0065 |

FOREIGN PATENT DOCUMENTS

| | | | | |
|---|---|---|---|---|
| JP | 2010008837 | A | 1/2010 | |
| JP | 2011210674 | A | 10/2011 | |
| JP | 2018133304 | A | 8/2018 | |
| JP | 2019145739 | A | 8/2019 | |
| JP | 2020031108 | A | 2/2020 | |
| JP | 2020038760 | A | 3/2020 | |
| JP | 6680349 | B1 | 4/2020 | |
| JP | 2020057748 | A | 4/2020 | |
| JP | 2020096151 | A | 6/2020 | |
| WO | WO-2012141094 | A1 * | 10/2012 | G02F 1/133605 |

* cited by examiner

LIGHT-EMITTING MODULE INCLUDING FIRST HOLE PORTION

CROSS REFERENCE TO RELATED APPLICATION

This application claims priority to Japanese Patent Application No. 2020-35183, filed on Mar. 2, 2020 and Japanese Patent Application No. 2020-202010, filed on Dec. 4, 2020, the disclosures of which are hereby incorporated by reference in their entireties.

BACKGROUND

The present disclosure relates to a light-emitting module. The present disclosure also relates to a surface-emission light source which includes one or more light-emitting modules.

Japanese Patent Publication No. 2002-231037 discloses a direct-lit backlight unit for liquid crystal display devices, which includes a plurality of light-emitting diodes (LED) and a lightguide plate covering the light-emitting diodes. In the backlight unit disclosed in Japanese Patent Publication No. 2002-231037, the lower surface of the lightguide plate has a plurality of cylindrical cavities. Each of the plurality of light-emitting diodes is provided inside a corresponding one of the plurality of cavities. Each of the cavities has a reflecting layer at the upper surface that faces the light-emitting diode. Light from the light-emitting diode is brought from the lateral surface of the cavity to the inside of the lightguide plate.

SUMMARY

Further reducing the thickness of a light-emitting module which includes a plurality of light sources while suppressing luminance non-uniformity is beneficial. Reducing the thickness of the light-emitting module enables further size reduction of a device which includes the light-emitting module as a backlight, for example.

A light-emitting module according to an embodiment of the present disclosure is a light-emitting module which includes a two-dimensional array of a plurality of light-emitting units. Each of the light-emitting units includes a lightguide plate, a light source, and a light diffusing layer. The light guide plate has a first surface and a first hole portion. The first hole portion has at least one lateral surface and an opening at the first surface. The light source is provided at least partially inside the first hole portion. The light source includes a light-emitting element. The light diffusing layer covers part of the at least one lateral surface of the first hole portion.

According to at least any of the embodiments of the present disclosure, a light-emitting module is provided having improved optical uniformity although it is slim.

DETAILED DESCRIPTION

Embodiments of the present disclosure will now be described in detail with reference to the drawings. The following embodiments are illustrative, and the light-emitting module and the surface-emission light source of the present disclosure are not limited thereto. For example, the numerical values, shapes, materials, steps, and the order of steps, etc., to be shown in the following embodiments are merely examples, and various modifications can be made thereto so long as they do not lead to technical contradictions. The embodiments described below are merely illustrative, and various combinations are possible so long as they do not lead to technical contradictions.

The size, the shape, etc., of the components shown in the figures may be exaggerated for the ease of understanding, and they may not represent the size and the shape of the components, the size relationship therebetween in an actual light-emitting module or surface-emission light source. Some components may be omitted in order to prevent the figures from becoming excessively complicated.

In the following description, components of like functions may be denoted by like reference signs and may not be described redundantly. Terms indicating specific directions and positions (e.g., "upper", "upward", "lower", "downward", "right", "left", and other terms including such terms) may be used in the following description. Note however that these terms are used merely for the ease of understanding relative directions or positions in the figure being referred to. The arrangement of components in figures from documents other than the present disclosure, actual products, actual manufacturing apparatuses, etc., does not need to be equal to that shown in the figure being referred to, as long as it conforms with the directional or positional relationship as indicated by terms such as "upper" and "lower" in the figure being referred to. In the present disclosure, the term "parallel" encompasses cases where two straight lines, sides, planes, etc., are in the range of about 0±5°, unless otherwise specified. In the present disclosure, the term "perpendicular" or "orthogonal" encompasses cases where two straight lines, sides, planes, etc., are in the range of about 90±5°, unless otherwise specified.

Embodiment of Light-Emitting Module

Figure 1:
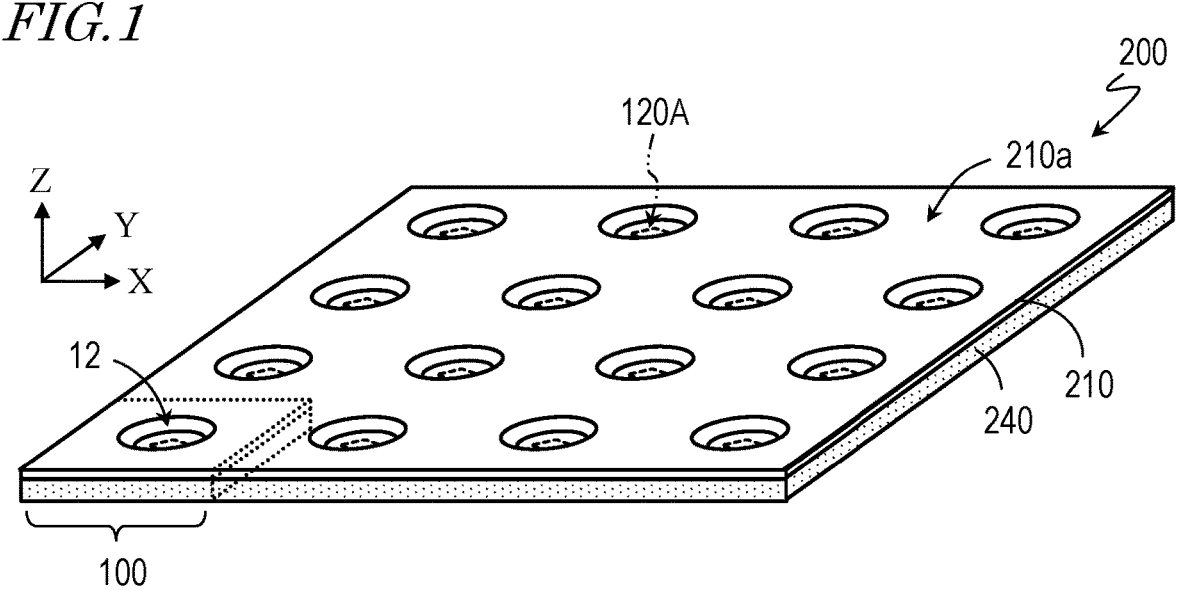
FIG. 1 is a perspective view schematically showing an external appearance of an exemplary light-emitting module according to an embodiment of the present disclosure.

FIG. 1 shows a light-emitting module of an embodiment of the present disclosure. The light-emitting module 200 shown in FIG. 1 includes: a lightguide plate 210 having an upper surface 210a; and a plurality of light sources 120A provided on the side opposite to the upper surface 210a of the lightguide plate 210. In the configuration illustrated in FIG. 1, the light-emitting module 200 further includes a light-reflective member 240 in the form of a layer which is located below the lightguide plate 210, and its entire structure has a plate-like shape as a whole.

The shape of the upper surface 210a of the lightguide plate 210 as viewed from top can be rectangular as a whole. Note that FIG. 1 also shows arrows in the X direction, the Y direction and the Z direction, which are orthogonal to each other, for the purpose of illustration. Herein, the X direction and the Y direction respectively coincide with one and the other of mutually orthogonal sides of the rectangular shape of the upper surface 210a. In the following sections, arrows indicating these directions may be also shown in other figures of the present disclosure.

The upper surface 210a of the lightguide plate 210 is configured as the emission surface of the light-emitting module 200. The length of one side of the rectangular shape of the upper surface 210a is in the range of, for example, not less than 1 cm and not more than 200 cm. In a typical embodiment of the present disclosure, one side of the rectangular shape of the upper surface 210a of the lightguide plate 210 has a length of not less than 20 mm and not more than 25 mm. When the upper surface 210a has a rectangular shape, the longitudinal length and the transverse length of the rectangular shape of the upper surface 210a can be, for example, about 24.3 mm and about 21.5 mm, respectively.

As shown by dotted lines in FIG. 1, the light-emitting module 200 is an aggregate of a plurality of light-emitting units 100. Each of the plurality of light-emitting units 100 includes at least one light source 120A. In the configuration illustrated in FIG. 1, the light-emitting module 200 includes 16 light-emitting units 100 in total which are two-dimensionally arrayed. Herein, the 16 light-emitting units 100 are arrayed in 4 rows and 4 columns. The number of light-emitting units 100 included in the light-emitting module 200 and the arrangement of the light-emitting units 100 are appropriately determined and not limited to the configuration shown in FIG. 1.

In the configuration illustrated in FIG. 1, each of the light-emitting units 100 has a hole portion 12. Herein, the hole portion 12 is formed in the lightguide plate 210 so as to have a form of a recess which includes, in its part, an opening at the upper surface 210a of the lightguide plate 210. In the configuration illustrated in FIG. 1, the light source 120A is located substantially right below a corresponding hole portion 12. In this example, in accordance with the array of the light-emitting units 100 in 4 rows and 4 columns, the light sources 120A are also arrayed in 4 rows and 4 columns along the X direction and the Y direction.

Figure 2:
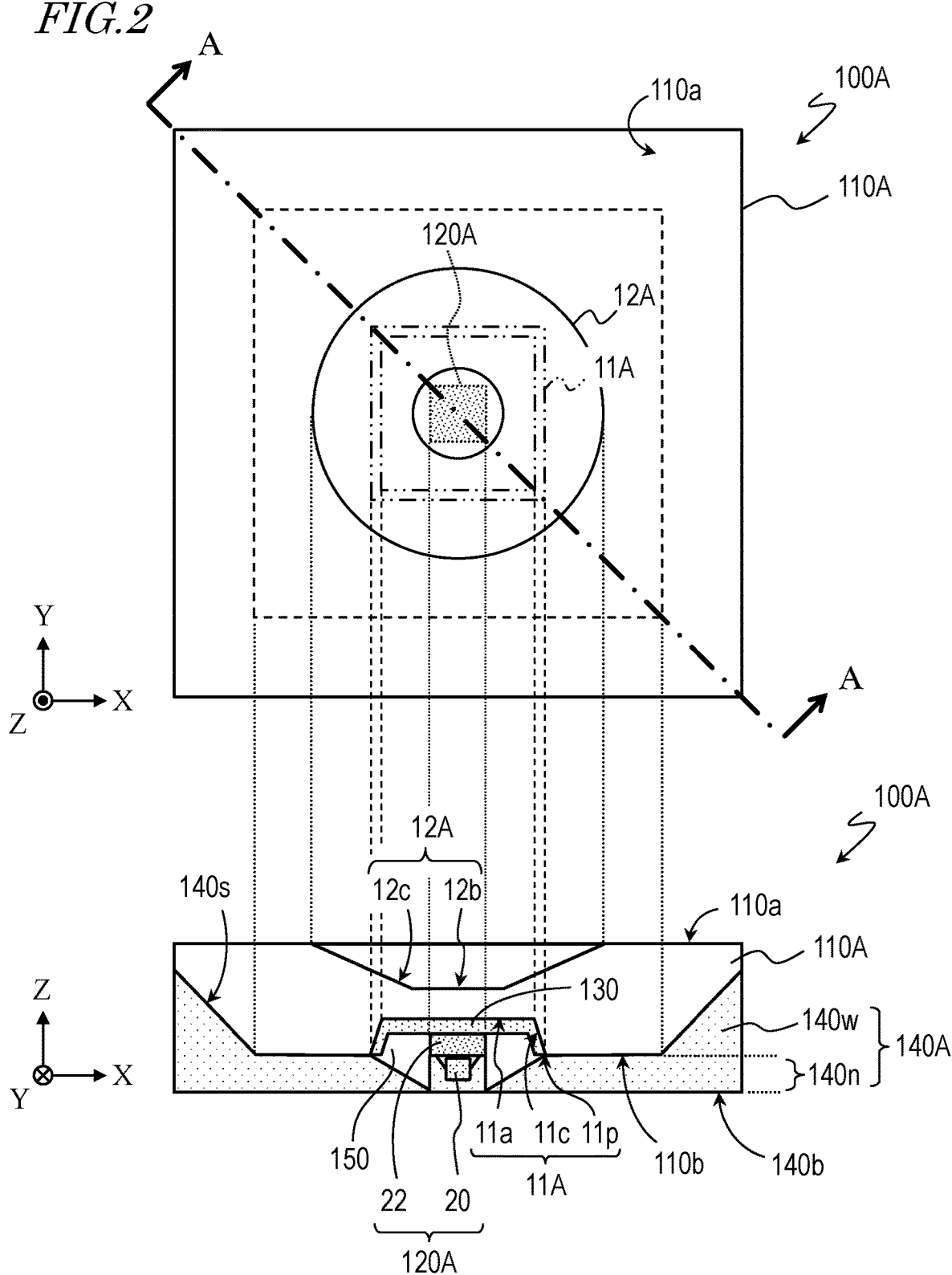
FIG. 2 schematically shows an exemplary external appearance of an exemplary light-emitting unit that is a constituent of the light-emitting module shown in FIG. 1, as viewed from the upper surface side of the lightguide plate, and a cross section of the light-emitting unit taken along a plane parallel to ZX plane near the center of the light-emitting unit.
Figure 3:
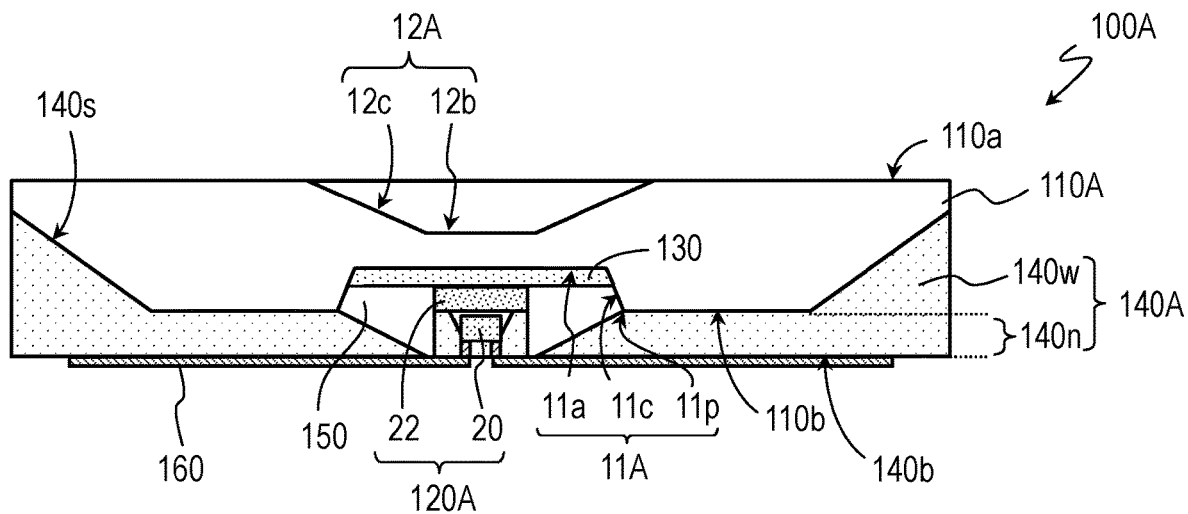
FIG. 3 is a schematic cross-sectional view of the light-emitting unit shown in FIG. 2 taken along line A-A.

FIG. 2 and FIG. 3 shows an example of the light-emitting unit. The light-emitting unit 100A shown in FIG. 2 and FIG. 3 is an example of the light-emitting units 100 that have been described with reference to FIG. 1. FIG. 2 schematically shows, together in a single drawing, an external appearance of the light-emitting unit 100A as viewed from the upper surface 210a side of the lightguide plate 210 and a cross section of the light-emitting unit 100A taken along a plane perpendicular to the upper surface 210a of the lightguide plate 210 near the center of the light-emitting unit 100A. FIG. 3 shows a cross section of the light-emitting unit 100A taken along line A-A of FIG. 2.

As shown in FIG. 2 and FIG. 3, each light-emitting unit 100A includes a lightguide plate 110A, a light source 120A, a light diffusing layer 130, and a light-reflective member 140A. The light source 120A has, for example, a rectangular parallelepiped structure which includes, in its part, a light-emitting element 20. Herein, the light source 120A also includes a light-transmitting member 22 in addition to the light-emitting element 20.

The lightguide plate 110A is part of the lightguide plate 210 shown in FIG. 1. As shown in the lower part of FIG. 2 and FIG. 3, the lightguide plate 110A has the lower surface 110b (first surface) and the upper surface 110a (second surface) that is opposite to the lower surface 110b, and the light-reflective member 140A is located at a side closer to the lower surface 110b of the lightguide plate 110A. The light-reflective member 140A is part of the light-reflective member 240 shown in FIG. 1.

In accordance with the rectangular shape of the upper surface 210a of the lightguide plate 210, herein, the shape of the lightguide plate 110A as viewed from top is also rectangular such as oblong square. Note that the lightguide plate 110A can be in the form of a single lightguide plate which is continuous between two adjoining light-emitting units 100A in the light-emitting module 200. Note that, however, for example, when each light-emitting unit 100A includes an independent lightguide plate 110A, a definite border can be found between the lightguide plates 110A of two light-emitting units 100A in the light-emitting module 200.

The upper surface 110a of the lightguide plate 110A has a hole portion 12A which is provided substantially at the central part of the upper surface 110a. For the sake of convenience in description, the hole portion 12A provided at a side closer to the upper surface 110a of the lightguide plate is hereinafter referred to as "second hole portion". The second hole portion 12A is an example of the hole portion 12 shown in FIG. 1. That is, the second hole portion 12A shown in FIG. 2 and FIG. 3 is one of the plurality of hole portions 12 of the lightguide plate 210 shown in FIG. 1. In this example, the second hole portion 12A has the shape of an inverted truncated cone defined by a bottom surface 12b and a lateral surface 12c.

The lightguide plate 110A further has a first hole portion 11A at the lower surface 110b. The first hole portion 11A has an opening 11p at the lower surface 110b of the lightguide plate 110A. As shown in the lower part of FIG. 2 and FIG. 3, in this example, the first hole portion 11A is present in part of the lower surface 110b of the lightguide plate 110A substantially right below the second hole portion 12A that is positioned at a side closer to the upper surface 110a.

In the configuration illustrated in FIG. 2 and FIG. 3, the first hole portion 11A is provided in the lightguide plate 110A so as to have the form of a recess of a truncated quadrangular pyramid shape. That is, in this example, the first hole portion 11A has a rectangular bottom surface 11a and four lateral surfaces 11c. The bottom surface 11a of the first hole portion 11A faces the bottom surface 12b of the second hole portion 12A of the inverted truncated cone shape positioned at a side closer to the upper surface 110a of the lightguide plate 110A, and each of the four lateral surfaces 11c of the first hole portion 11A is present between the rectangular opening 11p formed in the lower surface 110b of the lightguide plate 110A and the bottom surface 11a.

Herein, "the bottom surface of the first hole portion" refers to a surface which forms the bottom of the first hole portion when the lower surface of the lightguide plate faces upward. In this specification, the term "bottom surface" can be used while leaving the posture of the light-emitting module out of consideration. When the light-emitting unit 100A is in the posture shown in FIG. 3, the bottom surface 11a of the first hole portion 11A can be considered as the ceiling of a dome-like structure body formed at a side closer to the lower surface 110b of the lightguide plate 110A.

In this example, the sides which define the rectangular shape of the bottom surface 11a of the first hole portion 11A are parallel to the sides of the rectangular shape of the upper surface 110a of the lightguide plate 110A. Note that, however, the arrangement of the first hole portion 11A is not limited to this example. For example, the first hole portion 11A may be provided in the lower surface 110b of the lightguide plate 110A such that, for example, the diagonal lines of the rectangular bottom surface 11a are substantially parallel to the sides of the rectangular shape of the upper surface 110a of the lightguide plate 110A.

The previously-described light source 120A is provided at a side closer to the lower surface 110b of the lightguide plate 110A. As understood from the upper part of FIG. 2, the light source 120A is present inside the first hole portion 11A on the lower surface 110b side of the lightguide plate 110A in a top view. The light source 120A is bonded to the inside of the first hole portion 11A of the lightguide plate 110A such that the optical axis of the light-emitting element 20 is substantially coincident with the center of the second hole portion 12A, for example, the center of the inverted truncated cone shape of the second hole portion 12A.

As shown in the lower part of FIG. 2 and FIG. 3, the light diffusing layer 130 is provided inside the first hole portion 11A. In the configuration illustrated in FIG. 2 and FIG. 3, the light diffusing layer 130 covers an approximate entirety of the bottom surface 11a of the first hole portion 11A. Part of the light diffusing layer 130 is present between the bottom surface 11a of the first hole portion 11A and the light source 120A.

In an embodiment of the present disclosure, the light diffusing layer 130 does not cover the entirety of the inner surfaces of the first hole portion 11A (herein, the bottom surface 11a and the lateral surfaces 11c), and a region exposed out of the light diffusing layer 130 is provided in the first hole portion 11A. In this example, the light diffusing layer 130 is located on part of the lateral surfaces 11c of the first hole portion 11A which is present at the ZX cross section (see the lower part of FIG. 2) while the light diffusing layer 130 is not located on part of the lateral surfaces 11c which is present on the diagonal lines of the rectangular shape of the lightguide plate 110A (see FIG. 3). That is, in an embodiment of the present disclosure, the light diffusing layer 130 selectively covers part of one or more lateral surfaces which define the shape of the first hole portion 11A. In other words, the light diffusing layer 130 does not cover the entirety of the lateral surfaces of the first hole portion 11A.

In the light-emitting module 200 of the present embodiment, light emitted from the light-emitting element 20 of the light source is introduced into the lightguide plate 210. The light introduced into the lightguide plate 210 is diffused inside the lightguide plate 210 and thereafter exits from the upper surface 210a of the lightguide plate 210. Part of the light emitted from the light-emitting element 20 enters the light diffusing layer 130. As will be described later, the light diffusing layer 130 is formed of, for example, a white resin material so that the light diffusing layer 130 can reflect large part of the light entered the light diffusing layer 130 although the light diffusing layer 130 can transmit part of the light entered the light diffusing layer 130.

In the present embodiment, the light diffusing layer 130 covers part of the inner surfaces of the first hole portion which is located on the side opposite to the upper surface 210a of the lightguide plate 210 rather than the entirety of the inner surfaces. In the example shown in FIG. 2 and FIG. 3, particularly, part of the inner surfaces of the first hole portion 11A which is present on the diagonal lines of the rectangular shape of the light-emitting unit 100A includes a region which is not covered with the light diffusing layer 130. Light emitted from the light source 120A and traveling in a direction parallel to the sides of the rectangular shape of the light-emitting unit 100A can be diffused or reflected by the light diffusing layer 130, while another part of the light traveling along the diagonal lines of the rectangular shape of the light-emitting unit 100A can arrive at the corners of the lightguide plate 110A without being diffused or reflected by the light diffusing layer 130. As a result, decrease of the luminance at the corners of the lightguide plate 110A which are away from the light-emitting element 20 by a relatively large distance is suppressed, and the difference in luminance across the plane of the upper surface 110a of the lightguide plate 110A is reduced.

Specifically, according to an embodiment of the present disclosure, part of the light emitted from the light-emitting element 20 traveling along the diagonal lines of the rectangular shape of the light-emitting unit 100A and entering the lightguide plate 110A can be relatively increased while suppressing increase of another part of the light emitted from the light-emitting element 20 traveling in a direction parallel to the sides of the rectangular shape of the light-emitting unit 100A and entering the lightguide plate 110A. Thus, according to an embodiment of the present disclosure, light can be asymmetrically diffused inside the lightguide plate 110A with respect to the light-emitting element 20 which is assumed as being at the center. Therefore, the luminance of a region of the upper surface 110a of the lightguide plate 110A in which the luminance is likely to be relatively low can be compensated for, so that reduction in total thickness of the optical unit and reduction in luminance non-uniformity can be simultaneously achieved.

In the exemplary configuration described with reference to FIG. 2 and FIG. 3, in each of the light-emitting units, the light diffusing layer 130 is interposed between the lightguide plate and the light source. Thus, the luminance of part of the upper surface 210a of the lightguide plate 210 particularly right above the light-emitting element 20 can be prevented from being extremely high as compared with the other regions. In other words, at the upper surface 210a of the lightguide plate 210, occurrence of luminance non-uniformity which is attributed to a brighter region formed right above the light-emitting element 20 can be suppressed.

Hereinafter, the constituents of the light-emitting unit 100A will be described in more detail.

Lightguide Plate 110A

The lightguide plate 110A has the function of diffusing light from the light source 120A and emitting it from the upper surface 110a. The lightguide plate 110A is a substantially plate-shaped light-transmitting member that may be formed of a thermoplastic resin such as acrylic, polycarbonate, cyclic polyolefin, polyethylene terephthalate and polyester, a thermosetting resin such as epoxy and silicone, or glass. Particularly, polycarbonate, among others, can realize a high transparency while being inexpensive. The lightguide plate 110A may have a light diffusion function by including a material dispersed therein that has a different refractive index than that of the base material, for example. Note that the term "light-transmitting" as used herein is understood to encompass diffusiveness for incident light, and not limited to being "transparent".

Herein, the upper surface 110a of the lightguide plate 110A has a second hole portion 12A which is opposite to the first hole portion 11A that is provided at the lower surface 110b. An air layer is formed inside the second hole portion 12A, so that a portion of light traveling through the lightguide plate 110A toward the second hole portion 12A can be reflected at the bottom surface 12b or the lateral surface 12c that is the interface between the second hole portion 12A and the air layer. That is, the second hole portion 12A has the function of a light-diffusing structure which is capable of reflecting light emitted from the light source 120A and introduced from the lower surface 110b side of the lightguide plate 110A such that the reflected light can be diffused throughout the plane of the lightguide plate 110A.

By providing the second hole portion 12A as such a light-diffusing structure in the lightguide plate 110A, light traveling toward the interface between the second hole portion 12A and the air layer can be effectively diffused throughout the plane of the lightguide plate 110A, and as a result, the luminance improves at the upper surface 110a exclusive of the region right above the light-emitting element 20. That is, the luminance non-uniformity across the upper surface 110a of the light-emitting unit 100A can be suppressed, and the second hole portion 12A contributes to reduction in thickness of the lightguide plate 110A. The thickness of the lightguide plate 110A, i.e., the distance from the lower surface 110b to the upper surface 110a, is typically not less than about 0.1 mm and not more than about 5 mm. According to an embodiment of the present disclosure, the thickness of the lightguide plate 110A can be not more than about 0.6 mm. Note that it is not essential for an embodiment of the present disclosure that the air layer is formed inside the second hole portion 12A. A material having a lower refractive index than the material of the lightguide plate 110A can be supplied in at least part of the second hole portion 12A.

In the configuration illustrated in FIG. 2 and FIG. 3, the second hole portion 12A is a recessed portion provided at the upper surface 110a of the lightguide plate 110A and having an inverted truncated cone shape. The diameter of the circular shape of the bottom surface 12b of the second hole portion 12A is, for example, about 0.3 mm. In this example, the bottom surface 12b of the second hole portion 12A is parallel to the upper surface 110a of the lightguide plate 110A. Note that, however, the shape of the second hole portion 12A as the light-diffusing structure is not limited to the example shown in FIG. 2 and FIG. 3. For example, the second hole portion 12A may have a shape which does not have a bottom surface parallel to the upper surface 110a of the lightguide plate 110A. In other words, the second hole portion 12A may have an inverted conical/pyramidal shape such as inverted cone. The shape of the bottom surface 12b in the top view is not limited to a circular shape but may be an elliptical or polygonal shape. The second hole portion 12A of the lightguide plate 110A may have an inverted truncated pyramid shape which includes a plurality of lateral surfaces. Herein, the shape of the lateral surface 12c in cross-sectional view is linear but may be curved, or may include steps and/or bends.

The specific shape of the second hole portion 12A can be appropriately determined according to the shape and characteristics of the light-emitting element 20 located on the lower surface 110b side of the lightguide plate 110A. The depth of the second hole portion 12A, i.e., the distance along the Z direction in the drawings from the bottom surface 12b of the second hole portion 12A to the upper surface 110a of the lightguide plate 110A, is in the range of, for example, not less than 200 μm and not more than 400 μm. On the bottom surface 12b and/or the lateral surface 12c of the second hole portion 12A, a reflecting structure such as multilayer dielectric film, white resin layer, or the like, may be further provided.

As previously described, the lightguide plate 110A has the first hole portion 11A of, for example, a truncated quadrangular pyramid shape on the lower surface 110b side, at a position which faces the second hole portion 12A. Typically, the center of the first hole portion 11A is substantially coincident with the center of the second hole portion 12A located on the upper surface 110a side. The lightguide plate 210 of the light-emitting module 200 can be formed by injection molding, transfer molding, heat transfer, or the like. Inside of a cavity of a die, a raised portion projecting from the inner wall of the cavity is provided at a predetermined position, whereby a cross-sectional shape such as shown in FIG. 2 and FIG. 3 can be formed with high accuracy. Specifically, according to a molding method with the use of a die, the center of a first hole portion 11A and the center of a second hole portion 12A corresponding to that first hole portion 11A can be relatively easily made coincident.

The shape and size of the first hole portion 11A can be appropriately determined according to required optical characteristics. The shape of the first hole portion 11A in the top view is not limited to a rectangular shape but can be a circular shape. For example, the first hole portion 11A may have a truncated cone shape or the like. In this case, the first hole portion 11A has a shape which is defined by the bottom surface 11a and a single lateral surface 11c extending between the bottom surface 11a and the lower surface 110b of the lightguide plate 110A.

The size of the opening 11p of the first hole portion 11A formed at the lower surface 110b of the lightguide plate 110A can be, for example, not less than 0.05 mm and not more than 10 mm, preferably not less than 0.1 mm and not more than 1 mm. Herein, when the opening 11p has for example a rectangular shape in the top view, the size of the opening 11p of the first hole portion 11A refers to a length of the rectangular shape along a diagonal direction. When the opening 11p has a circular shape in the top, the size of the opening 11p of the first hole portion 11A refers to the diameter of the circular shape.

Light Diffusing Layer 130

In the present embodiment, the light diffusing layer 130 is present inside the first hole portion 11A of the lightguide plate 110A. The light diffusing layer 130 covers an approximate entirety of the bottom surface 11a of the first hole portion 11A and part of the lateral surfaces 11c of the first hole portion 11A. The light diffusing layer 130 is formed of, for example, a resin in which a light-reflective filler is dispersed or a light-reflective material such as metal. The light diffusing layer 130 may be a multilayer dielectric film.

In this specification, the term "light-reflective" refers to a circumstance where the reflectance at the emission peak wavelength of the light-emitting element 20 is not less than 60%. The reflectance of the light diffusing layer 130 at the emission peak wavelength of the light-emitting element 20 is more beneficially not less than 70%, still more beneficially not less than 80%. It is not essential that the light diffusing layer 130 completely blocks light from the light-emitting element 20. In this sense, the light diffusing layer 130 may have a semi-transmissive property such that the light diffusing layer 130 transmits part of the light from the light-emitting element 20.

Figure 4:
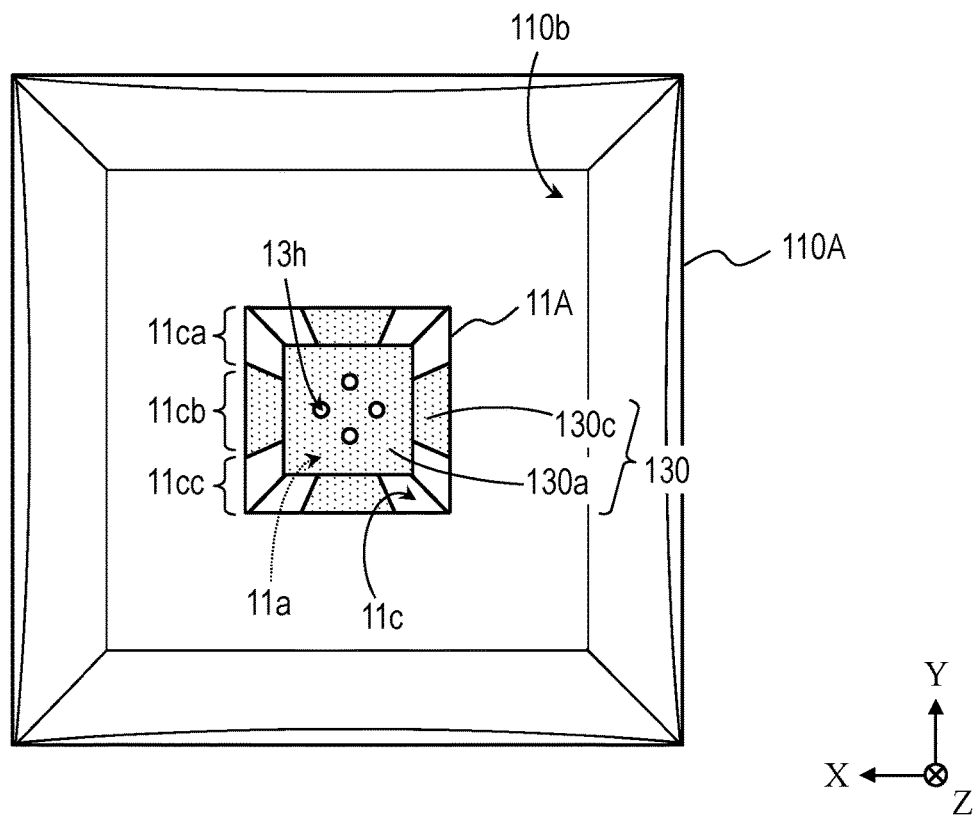
FIG. 4 is a schematic top view showing an exemplary shape of a light diffusing layer as viewed from the lower surface side of the lightguide plate.

FIG. 4 schematically shows an exemplary shape of the light diffusing layer 130 as viewed from the lower surface 110b side of the lightguide plate 110A. The first hole portion 11A has a bottom surface 11a and four lateral surfaces 11c. As understood from FIG. 2 and FIG. 3, herein, each of the four lateral surfaces 11c is inclined with respect to the lower surface 110b of the lightguide plate 110A. The bottom surface 11a and the four lateral surfaces 11c form a truncated quadrangular pyramid shape of the first hole portion 11A. In the configuration illustrated in FIG. 4, the light diffusing layer 130 includes a first portion 130a which covers an approximate entirety of the bottom surface 11a of the first hole portion 11A and four second portions 130c which covers part of the respective lateral surfaces 11c.

Now, the four slope surfaces which form the lateral surfaces of the truncated quadrangular pyramid shape of the first hole portion 11A are discussed. Herein, each of the four lateral surfaces 11c includes a first region 11ca, a second region 11cb and a third region 11cc which are arranged along one side of the rectangular shape of the bottom surface 11a. Of these regions, the second region 11cb is located between the first region 11ca and the third region 11cc along one side of the rectangular shape of the bottom surface 11a. In the example shown in FIG. 4, the second portions 130c of the light diffusing layer 130 is selectively provided on the second region 11cb. In other words, the first region 11ca and the third region 11cc are not covered with the light diffusing layer 130.

Because the inner surfaces of the first hole portion 11A, in which the light source 120A is provided, include a region not covered with the light diffusing layer 130, a larger amount of light can be brought from that region into the lightguide plate 110A as compared with a region covered with the light diffusing layer 130. Particularly, in this example, among the inner surfaces of the first hole portion 11A, the light diffusing layer 130 is selectively provided in a region near the center of each of the lateral surfaces 11c in which the distance to the side of the rectangular shape of the lightguide plate 110A is relatively small, while the light diffusing layer 130 is not provided in a region on each diagonal line of the rectangular shape of the lightguide plate 110A. Thus, the amount of light arriving at the corners of the rectangular shape of the lightguide plate 110A at which the luminance is likely to be relatively low can be increased while increase in luminance is suppressed near the middle of the sides of the rectangular shape of the lightguide plate 110A at which the distance from the light source 120A is relatively small. That is, the effect of suppressing occurrence of luminance non-uniformity across the upper surface 110a of the lightguide plate 110A, which is the emission surface, can be achieved.

In this example, the second portions 130c that are present on the second regions 11cb of the respective lateral surfaces 11c have a common shape among these lateral surfaces 11c. In other words, herein, it can be said that the light diffusing layer 130 has a symmetrical shape with respect to the center of the light-emitting unit 100A in the top view. More specifically, the light diffusing layer 130 in the top view has, herein, a shape of 4-fold rotational symmetry. By forming the light diffusing layer 130 so as to have a shape of rotational symmetry, for example, occurrence of bright or dark regions in an asymmetrical fashion across the emission surface can be avoided. Note that, in this example, the second portions 130c of the light diffusing layer 130 are not spatially separated from the first portion 130a. The second portions 130c are continuous with the first portion 130a at the position of the boundary between the bottom surface 11a and the lateral surfaces 11c of the first hole portion 11A.

Next, the bottom surface of the first hole portion 11A, which has a truncated quadrangular pyramid shape, is discussed. The first portion 130a of the light diffusing layer 130 covers, for example, the entirety of the bottom surface 11a of the first hole portion 11A. By forming the light diffusing layer 130 so as to cover the entirety of the bottom surface 11a of the first hole portion 11A, the luminance in a region of the lightguide plate 110A which faces the light source 120A can be prevented from being excessively high.

Note that, however, it is not essential in an embodiment of the present disclosure that the light diffusing layer 130 covers the entirety of the bottom surface 11a of the first hole portion 11A. In the configuration illustrated in FIG. 4, the first portion 130a of the light diffusing layer 130 has four openings 13h.

Each of the openings 13h is a hollow portion penetrating through the light diffusing layer 130 from the surface that faces the bottom surface 11a of the first hole portion 11A to the surface closer to the light source 120A. Herein, the four openings 13h are provided in the first portion 130a of the light diffusing layer 130 and arranged symmetrically about the center of the first hole portion 11A. At the positions of the openings 13h, part of the bottom surface 11a of the first hole portion 11A is exposed out of the light diffusing layer 130. In other words, in this example, the light diffusing layer 130 covers part of the bottom surface 11a of the first hole portion 11A rather than the entirety of the bottom surface 11a.

When the first portion 130a of the light diffusing layer 130 includes one or more regions in the form of, for example, circular openings in which the bottom surface 11a of the first hole portion 11A is exposed, light from the light source 120A can be brought into the lightguide plate 110A via those openings. When part of the light diffusing layer 130 which is present, for example, between the light source 120A and the lightguide plate 110A has one or more openings 13h, excessive luminance decrease in a region right above the first hole portion 11A, which is attributed to the light diffusing layer 130 provided in the first hole portion 11A, can be avoided. Note that the shape, number and arrangement of the openings 13h can be appropriately determined according to the light distribution desired for the light-emitting module. When the openings 13h are, for example, circular through holes, the openings 13h can have a diameter of not less than 150 μm and not more than 300 μm.

The light diffusing layer 130 can be formed by, for example, applying a light-reflective resin material to the bottom surface 11a and the lateral surfaces 11c of the first hole portion 11A and then curing the resin material by heat, light, or the like. As the light-reflective resin material, a material can be used in which a light-reflective filler is dispersed in a base material such as silicone resin or the like.

Application of the resin material can be realized by, for example, inkjet printing. Inkjet printing can realize formation of a light diffusing layer 130 such as illustrated in FIG. 4, which is shaped so as to selectively cover part of the bottom surface 11a and part of the lateral surfaces 11c of the first hole portion 11A, without the necessity of a mask or the like.

Examples of the base material of the resin material used for forming the light diffusing layer 130 include a silicone resin, a phenolic resin, an epoxy resin, a BT resin, a polyphthalamide (PPA), etc. The light-reflective filler used can be metal particles, or particles of an inorganic or organic material having a higher refractive index than the base material. Examples of the light-reflective filler include particles of titanium dioxide, silicon oxide, zirconium dioxide, potassium titanate, aluminum oxide, aluminum nitride, boron nitride, mullite, niobium oxide, barium sulfate, or particles of various rare earth oxides such as yttrium oxide and gadolinium oxide. It is beneficial that the light diffusing layer 130 is white.

In the above-described example, the bottom surface 11a of the first hole portion 11A is a flat surface. However, the shape of the bottom surface 11a is not limited to a flat surface. As will be described below, the bottom surface 11a may have a pillar-like structure.

Figure 5:
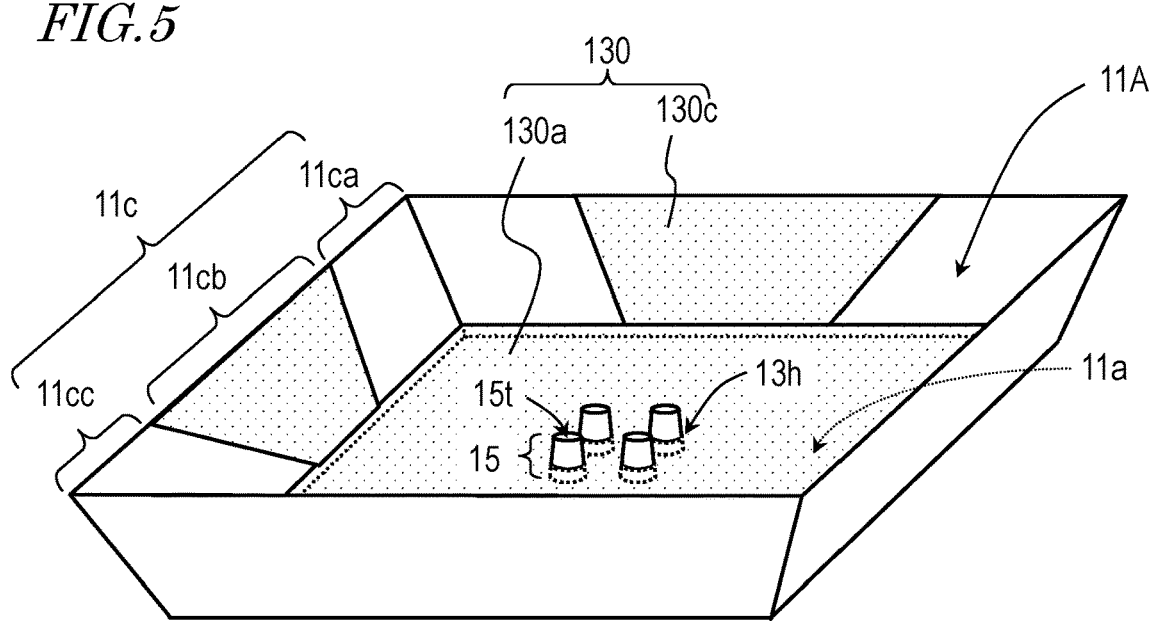
FIG. 5 is a schematic perspective view showing another example of the shape of a first hole portion of the lightguide plate, in which an enlarged view of part of the lightguide plate around the first hole portion and the light diffusing layer in the first hole portion is shown.

FIG. 5 schematically shows part of the lightguide plate 110A, including surroundings of the first hole portion 11A and the light diffusing layer 130 in the first hole portion 11A. In the configuration illustrated in FIG. 5, the bottom surface 11a of the first hole portion 11A of the lightguide plate 110A includes a plurality of pillars 15 each projecting from the bottom surface 11a inside the first hole portion 11A. Herein, each of the pillars 15 has a top surface 15t, and is in the shape of a substantially-circular pole projecting from the surface of the light diffusing layer 130.

As schematically shown in FIG. 5, in this example, the first portion 130a of the light diffusing layer 130 covers the bottom surface 11a of the first hole portion 11A exclusive of the regions in which the plurality of pillars 15 are provided. It can be said that the pillars 15 are present inside the above-described openings 13h.

Figure 6:
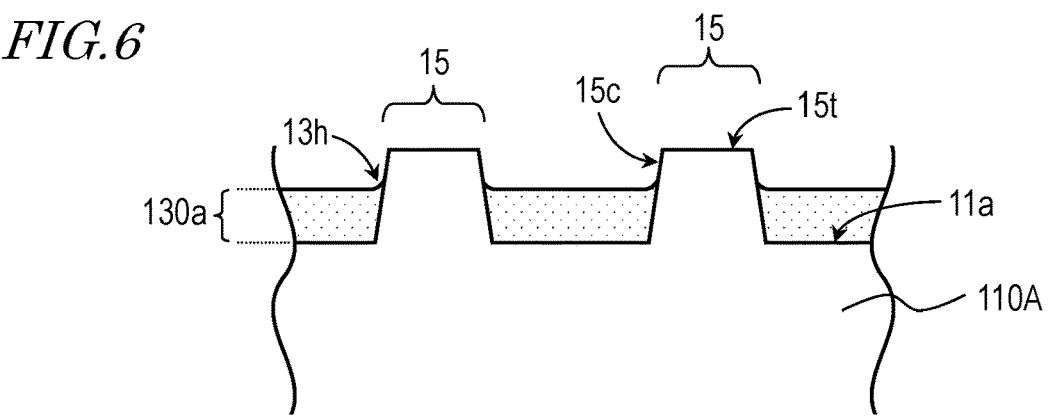
FIG. 6 is a schematic enlarged cross-sectional view showing pillars formed in the first hole portion of the lightguide plate and their surroundings.

FIG. 6 schematically shows an enlarged cross section of the pillars 15 and their surroundings. As previously described, when the light diffusing layer 130 is made of a material whose base material is a resin, for example, inkjet printing can be employed. In this case, the resin material is applied on the bottom surface 11a of the first hole portion 11A except for the positions of the pillars 15, whereby the openings 13h can be formed at the positions of the pillars 15.

As shown in FIG. 6, the top surface 15t of each of the pillars 15 is located higher than the surface of the first portion 130a of the light diffusing layer 130. In the process of forming the light diffusing layer 130 by inkjet printing, the material of the light diffusing layer 130 is applied in a predetermined pattern, whereby the material of the light diffusing layer 130 is not basically applied onto the top surface 15t of each of the pillars 15. Even if an uncured material is adhered to the top surfaces 15t or the lateral surfaces 15c of the pillars 15, the uncured material flows toward the bottom surface 11a so that the material of the light diffusing layer 130 is unlikely to remain on the top surface 15t and on the lateral surface 15c. Thus, due to the pillars 15 provided on the bottom surface 11a, the shape and positions of the openings 13h of the light diffusing layer 130 can be controlled with higher accuracy.

The plurality of pillars 15 are typically provided in regions of the bottom surface 11a where the light source 120A face. As previously described, the residue of the material of the light diffusing layer 130 is not basically present on the top surface 15t of each of the pillars 15, light from the light source 120A can be brought into the lightguide plate 110A via the top surface 15t.

Figure 7:
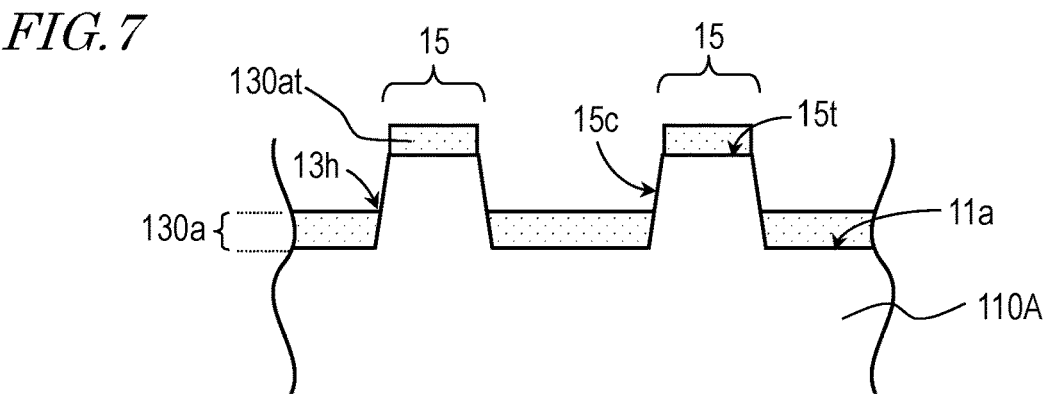
FIG. 7 is a schematic enlarged cross-sectional view showing pillars formed in the first hole portion of the lightguide plate and their surroundings.

The light diffusing layer 130 may be a metal film or a multilayer dielectric film. In this case, for example, sputtering can be employed in forming the light diffusing layer 130. FIG. 7 shows another example of a cross section of the pillars 15 and their surroundings. When sputtering is employed in forming the light diffusing layer 130, as schematically shown in FIG. 7, the light diffusing layer 130 can be formed so as to cover the top surfaces 15t of the pillars 15, a region of the bottom surface 11a of the first hole portion 11A which does not overlap the pillars 15. In this example, the light diffusing layer 130 includes not only the first portion 130a but also a third portion 130at located on the top surfaces 15t of the pillars 15.

Also when sputtering is employed, the material of the light diffusing layer 130 is not basically deposited on the lateral surfaces 15c of the pillars 15. Therefore, light from the light source 120A can be brought into the lightguide plate 110A via the lateral surfaces 15c of the pillars 15. Note that a metal mask or the like may be used such that the material of the light diffusing layer 130 is not deposited on the top surfaces 15t of the pillars 15. In other words, the third portion 130at may not be formed.

Light-Emitting Element 20

Figure 8:
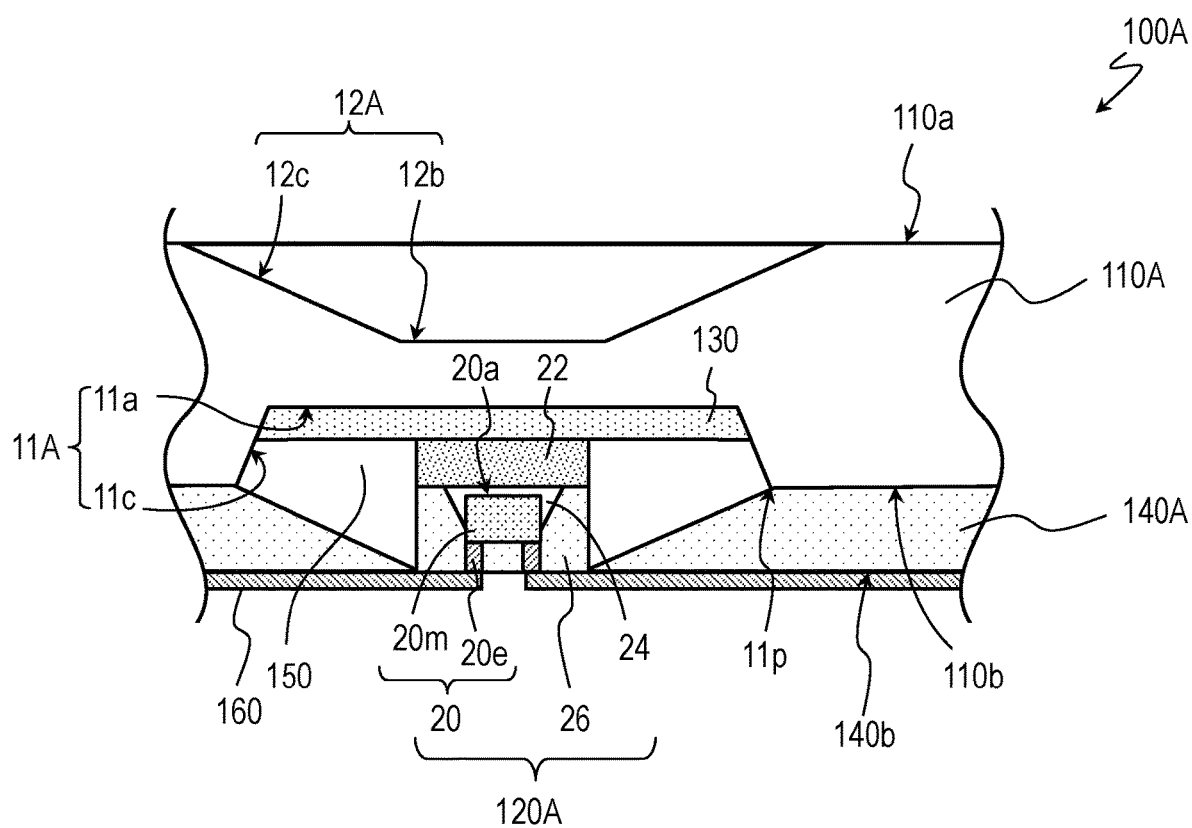
FIG. 8 is a schematic enlarged cross-sectional view showing part of the light-emitting module shown in FIG. 2 and FIG. 3, including a light source and its surroundings.

FIG. 8 schematically shows enlarged part of the light-emitting unit 100A shown in FIG. 2 and FIG. 3, including the light source 120A and its surroundings. As shown in FIG. 8, a second light-transmitting member 150 and part of the light source 120A are present inside the first hole portion 11A. As previously described, the light source 120A includes a light-emitting element 20 and a light-transmitting member 22. In the configuration illustrated in FIG. 8, the light source 120A further includes a light-transmitting adhesive member 24 and a cover member 26.

A typical example of the light-emitting element 20 in the light source 120A is LED. In the configuration illustrated in FIG. 8, the light-emitting element 20 includes a main body 20m and electrodes 20e located opposite to the upper surface 20a of the light-emitting element 20. The main body 20m includes, for example, a support substrate of sapphire or gallium nitride, etc., and a semiconductor layered structure on the support substrate.

The semiconductor layered structure includes an n-type semiconductor layer, a p-type semiconductor layer, and an active layer interposed between these semiconductor layers. The semiconductor layered structure may include a nitride semiconductor ($In_xAl_yGa_{1-x-y}N$, $0 \leq x$, $0 \leq y$, $x+y \leq 1$) capable of emitting light in the ultraviolet to visible range. In this example, the upper surface 20a of the light-emitting element 20 coincides with the upper surface of the main body 20m.

The electrodes 20e include a pair of a positive electrode and a negative electrode. The electrodes 20e have the function of supplying a predetermined current to the semiconductor layered structure.

The plurality of light-emitting elements 20 provided in the light-emitting module 200 may each be a device that emits blue light or may be a device that emits white light. The plurality of light-emitting elements 20 may include devices that emit light of different colors from each other. For example, the plurality of light-emitting elements 20 may include devices that emit red light, devices that emit blue light, and devices that emit green light. Herein, an LED that emits blue light is shown as an example of the light-emitting element 20.

Herein, the light-emitting element 20 in each of the light-emitting units 100A is secured, in the form of the light source 120A including the light-transmitting member 22, etc., to the lightguide plate 110A on the lower surface 110b side by the second light-transmitting member 150. When joined with the lightguide plate 110A, the electrodes 20e of the light-emitting element 20 in the light source 120A are located opposite to the bottom surface 11a of the first hole portion 11A. As shown in FIG. 8, part of the light source 120A can be present outside a space defined by the bottom surface 11a and the lateral surfaces 11c of the first hole portion 11A. The optical axis of the light-emitting element 20 substantially coincides with the center of the first hole portion 11A.

The shape of the light-emitting element 20 in the top view is typically a rectangular shape. The length of one side of the rectangular shape of the light-emitting element 20 is, for example, not more than 1000 μm. The longitudinal and transverse dimensions of the rectangular shape of the light-emitting element 20 may be not more than 500 μm. Light-emitting elements whose longitudinal and transverse dimensions are not more than 500 μm are inexpensively procurable. Alternatively, the longitudinal and transverse dimensions of the rectangular shape of the light-emitting element 20 may be not more than 200 μm. If the length of one side of the rectangular shape of the light-emitting element 20 is small, it is advantageous for rendering of high-definition images, local dimming operations, etc., in application to a backlight unit of a liquid crystal display device. Particularly in a light-emitting element whose longitudinal and transverse dimensions are each not more than 250 μm, the area of the upper surface is small so that the amount of light emitted from the lateral surfaces of the light-emitting element can be relatively large. Therefore, a batwing light distribution characteristic can be easily achieved. Herein, the batwing light distribution characteristic refers, in a broad sense, to a light distribution characteristic which is defined as an emission intensity distribution such that the emission intensity is higher at angles at which the absolute value of the light distribution angle is greater than 0°, where 0° is the optical axis that is perpendicular to the upper surface of the light-emitting element.

Light-Transmitting Member 22

The light-transmitting member 22 in the light source 120A is present between the bottom surface 11a of the first hole portion 11A and the upper surface 20a of the light-emitting element 20. In the configuration illustrated in FIG. 8, the light-transmitting member 22 has a substantially plate-like shape. However, the shape of the light-transmitting member 22 is not limited to this example. As will be described later, the light-transmitting member 22 can have any other shape than the plate-like shape.

Examples of the material of the light-transmitting member 22 include silicone resins, modified silicone resins, epoxy resins, modified epoxy resins, urea resins, phenolic resins, acrylic resins, urethane resins, fluoric resins, and a resin containing two or more of these resins. From the viewpoint of efficiently guiding light into the lightguide plate 110A, it is beneficial that the material of the light-transmitting member 22 has a lower refractive index than the material of the lightguide plate 110A. A material having a different refractive index from that of the base material may be dispersed in the material of the light-transmitting member 22 such that the light-transmitting member 22 can have a light diffusion function. For example, particles of titanium dioxide, silicon oxide, or the like, may be dispersed in the base material of the light-transmitting member 22.

The light-transmitting member 22 may contain phosphor particles or the like. The phosphor contained in the light-transmitting member 22 absorbs at least a portion of light emitted from the light-emitting element 20 and emits light at a wavelength different from the wavelength of the light from the light-emitting element 20. In this case, the light-transmitting member 22 can convert the wavelength of part of blue light from the light-emitting element 20 and emit yellow light, for example. With such a configuration, blue light that has passed through the light-transmitting member 22 and yellow light emitted from the phosphor contained in the light-transmitting member 22 are mixed together, resulting in white light.

In the configuration illustrated in FIG. 8, light emitted from the light-emitting element 20 is basically brought into the lightguide plate 110A via the light-transmitting member 22. Therefore, the color-mixed light is diffused inside the lightguide plate 110A and, for example, white light with suppressed luminance non-uniformity can be extracted from the upper surface 110a of the lightguide plate 110A. The present embodiment is advantageous in achieving uniform light as compared with a case where light is first diffused in the lightguide plate and then the wavelength thereof is converted.

The phosphor to be dispersed in the light-transmitting member 22 can be a known material. Examples of the phosphor include fluoride-based phosphors such as KSF-based phosphors, nitride-based phosphors such as CASN, YAG-based phosphors, and β-SiAlON phosphors. The KSF-based phosphors and CASN are examples of a wavelength converting substance which is capable of converting blue light to red light. The YAG-based phosphors are examples of a wavelength converting substance which is capable of converting blue light to yellow light. The β-SiAlON phosphors are examples of a wavelength converting substance which is capable of converting blue light to green light. The phosphor may be a quantum dot phosphor.

It is not essential that the phosphor contained in the light-transmitting member 22 is common among a plurality of light-emitting units 100 included in the same light-emitting module 200. Among the plurality of light-emitting units 100, the phosphor dispersed in the base material of the light-transmitting member 22 can differ. In some of a plurality of first hole portions 11A provided in the light-emitting units 100, a light-transmitting member containing a phosphor which is capable of converting incident blue light to yellow light may be provided and, in some others of the first hole portions 11A, a light-transmitting member containing a phosphor which is capable of converting incident blue light to green light may be provided. Further, in the remaining first hole portions 11A, a light-transmitting member containing a phosphor which is capable of converting incident blue light to red light may be provided.

Light-Transmitting Adhesive Member 24

As schematically shown in FIG. 8, the light-emitting element 20 is joined to the lower surface of the light-transmitting member 22 by the light-transmitting adhesive member 24. The light-transmitting adhesive member 24 is capable of transmitting light and covers at least part of the lateral surfaces of the light-emitting element 20. As shown in FIG. 8, the light-transmitting adhesive member 24 can include a layer-shaped portion located between the upper surface 20a of the light-emitting element 20 and the light-transmitting member 22.

The light-transmitting adhesive member 24 can be made of a resin material which contains a transparent resin as the base material. The light-transmitting adhesive member 24 has a transmittance of, for example, not less than 60% for light which has the emission peak wavelength of the light-emitting element 20. From the viewpoint of effectively using light, the transmittance of the light-transmitting adhesive member 24 at the emission peak wavelength of the light-emitting element 20 is beneficially not less than 70%, more beneficially not less than 80%.

A typical example of the base material of the light-transmitting adhesive member 24 is a thermosetting resin, such as epoxy resin, silicone resin, or the like. Examples of the base material of the light-transmitting adhesive member 24 include silicone resins, modified silicone resins, epoxy resins, phenol resins, polycarbonate resins, acrylic resins, polymethylpentene resins, polynorbornene resins, and a material containing two or more of these resins. The light-transmitting adhesive member 24 typically has a lower refractive index than that of the lightguide plate 110A. In the light-transmitting adhesive member 24, for example, a material having a different refractive index from the base material may be dispersed such that the light-transmitting adhesive member 24 has a light diffusion function.

The light-transmitting adhesive member 24 has an outer surface which is the interface with the cover member 26 which will be described later. Light emitted from the lateral surface of the light-emitting element 20 so as to be incident on the light-transmitting adhesive member 24 is reflected at the outer surface of the light-transmitting adhesive member 24 toward a region lying above the light-emitting element 20. The cross-sectional shape of the outer surface of the light-transmitting adhesive member 24 is not limited to a linear shape such as shown in FIG. 8. The cross-sectional shape of the outer surface of the light-transmitting adhesive member 24 may be a zigzag line, a curve which is convex in a direction toward the light-emitting element 20, or a curve which is convex in a direction away from the light-emitting element 20.

Cover Member 26

The cover member 26 is a member which is located on the lower surface side of the light-transmitting member 22 (on the side opposite to the lightguide plate 110A) and which is capable of reflecting light. As shown in FIG. 8, the cover member 26 covers the outer surface of the light-transmitting adhesive member 24, part of the lateral surfaces of the light-emitting element 20 which is not covered with the light-transmitting adhesive member 24, and the lower surface of the light-emitting element 20 which is opposite to the upper surface 20a exclusive of the electrodes 20e. The cover member 26 covers the lateral surface of the electrodes 20e, while the lower surface of the electrodes 20e is exposed out of the lower surface of the cover member 26.

As the material of the cover member 26, a material prepared by dispersing a light-reflective filler in a base material such as resin can be used likewise as for the light diffusing layer 130. For example, the material of the cover member 26 and the material of the light diffusing layer 130 may be the same. The lower surface of the light-emitting element 20, exclusive of the electrodes 20e, is covered with the cover member 26, whereby leakage of light to the side opposite to the upper surface 110a of the lightguide plate 110A can be suppressed. Further, the cover member 26 also covers the lateral surfaces of the light-emitting element 20 so that light from the light-emitting element 20 can be converged at a higher place and efficiently brought into the light-transmitting member 22.

Second Light-Transmitting Member 150

The light source 120A is provided on the first portion 130a of the light diffusing layer 130 by the second light-transmitting member 150. The second light-transmitting member 150 occupies the inner space of the first hole portion 11A exclusive of the light diffusing layer 130 and part of the light source 120A. Part of the second light-transmitting member 150 can be present between the first portion 130a of the light diffusing layer 130 and the light source 120A. In this example, the surface of the second light-transmitting member 150 is elevated above the lower surface 110b of the lightguide plate 110A.

The second light-transmitting member 150 can be made of a material which contains a transparent resin as the base material as is the light-transmitting adhesive member 24 in the light source 120A. The material of the second light-transmitting member 150 may be different from, or may be the same as, the material of the light-transmitting adhesive member 24. The second light-transmitting member 150 typically has a lower refractive index than that of the lightguide plate 110A.

The second light-transmitting member 150 can be formed by, for example, applying an uncured material into the first hole portion 11A in which the light diffusing layer 130 has been formed, providing a light source 120A in the first hole portion 11A such that the light-transmitting member 22 faces the light diffusing layer 130, and thereafter curing the uncured material. In this process, the shape of the surface of the second light-transmitting member 150 can be controlled by adjusting the amount and viscosity of the material of the second light-transmitting member 150. The surface of the second light-transmitting member 150 may be elevated above the lower surface 110b of the lightguide plate 110A as illustrated in FIG. 8 or may be substantially coplanar with the lower surface 110b of the lightguide plate 110A.

Light-Reflective Member 140A

The light-reflective member 140A is capable of reflecting light and covers at least part of the lower surface 110b of the lightguide plate 110A. As is the lightguide plate 110A, the light-reflective member 140 can be continuous so as to extend across two adjoining light-emitting units 100A in the light-emitting module 200.

The light-reflective member 140A is located on the lower surface side 110b of the lightguide plate 110A, whereby light traveling toward the lower surface 110b side of the lightguide plate 110A can be reflected at the interface between the lightguide plate 110A and the light-reflective member 140A toward the upper surface 110a, so that light can be more efficiently extracted from the upper surface 110a of the lightguide plate 110A. Particularly, herein, the light-reflective member 140A covers not only the lower surface 110b of the lightguide plate 110A but also the second light-transmitting member 150. By covering the second light-transmitting member 150 with the light-reflective member 140A, leakage of light from the second light-transmitting member 150 to the lower surface 110b side of the lightguide plate 110A can be suppressed, and the light extraction efficiency can be improved.

Refer again to FIG. 2 and FIG. 3. In the configuration illustrated in FIG. 2 and FIG. 3, The light-reflective member 140A includes a basal portion 140n which is in the shape of a layer and a wall portion 140w extending from the lower surface 110b side to the upper surface 110a side of the lightguide plate 110A. As shown in FIG. 2 and FIG. 3, the wall portion 140w of the light-reflective member 140A has a slope surface 140s which surrounds the first hole portion 11A. Light impinging on the slope surface 140s is reflected toward the upper surface 110a side of the lightguide plate 110A. Therefore, by providing the wall portion 140w in a peripheral portion of the lightguide plate 110A, the luminance in the peripheral portion of the lightguide plate 110A can be prevented from being relatively low as compared with the central portion. The cross-sectional shape of the slope surface 140s may be linear such as shown in FIG. 2 and FIG. 3 or may be curved. The cross-sectional shape of the slope surface 140s is not limited to such examples but may include steps, bends, etc.

The height of the wall portion 140w that surrounds the light-emitting element 20 may vary among a plurality of light-emitting units 100 included in a single light-emitting module 200 or may vary within a single light-emitting unit 100. For example, one of a plurality of slope surfaces 140s included in a single light-emitting module 200 which is located at the outermost position in the lightguide plate 210 of the light-emitting module 200 may have a greater height than the slope surfaces 140s located at the other portions of the lightguide plate 210.

The light-reflective member 140A can be formed of, for example, a light-reflective resin material by injection molding, transfer molding, or the like, as is the cover member 26 of the light source 120A. In this example, the lower surface 140b of the light-reflective member 140A is coplanar with the lower surface of the light source 120A. When the light-reflective member 140A and the cover member 26 are made of the same material, it can be said that the light-emitting unit 100A includes a light-reflective member which integrally covers the lower surface 110b of the lightguide plate 110A exclusive of the lower surface of the electrodes 20e of the light-emitting element 20. When the light-reflective member 140A is provided on the lower surface 110b side of the lightguide plate 110A, the effect of reinforcing the lightguide plate 110A can also be achieved.

According to an embodiment of the present disclosure, for example, the thickness of the structure including the light-reflective member 140A, in other words, the distance from the lower surface of the electrodes 20e of the light-emitting element 20 to the upper surface 110a of the lightguide plate 110A, can be reduced to, for example, 5 mm or smaller, 3 mm or smaller, or 1 mm or smaller. The distance from the lower surface of the electrodes 20e of the light-emitting element 20 to the upper surface 110a of the lightguide plate 110A can be not less than about 0.7 mm and not more than about 1.1 mm.

Wiring Layer 160

As shown in FIG. 3, in this example, the light-emitting unit 100A further includes an wiring layer 160 located on the lower surface 140b of the light-reflective member 140A. The wiring layer 160 is typically a single-layer or multilayer film which is made of a metal such as Cu. As previously described, the lower surface of the electrodes 20e of the light-emitting element 20 is exposed out of the cover member 26 of the light source 120A. As shown in the drawing, in this example, the wiring layer 160 includes a portion which is present on the cover member 26 of the light source 120A (see FIG. 8). The wiring layer 160 is electrically coupled with the electrodes 20e of the light-emitting element 20 and is coupled with an unshown power supply or the like so that it can serve as an interconnection for supplying a predetermined electric current to the light-emitting element 20.

Figure 9:
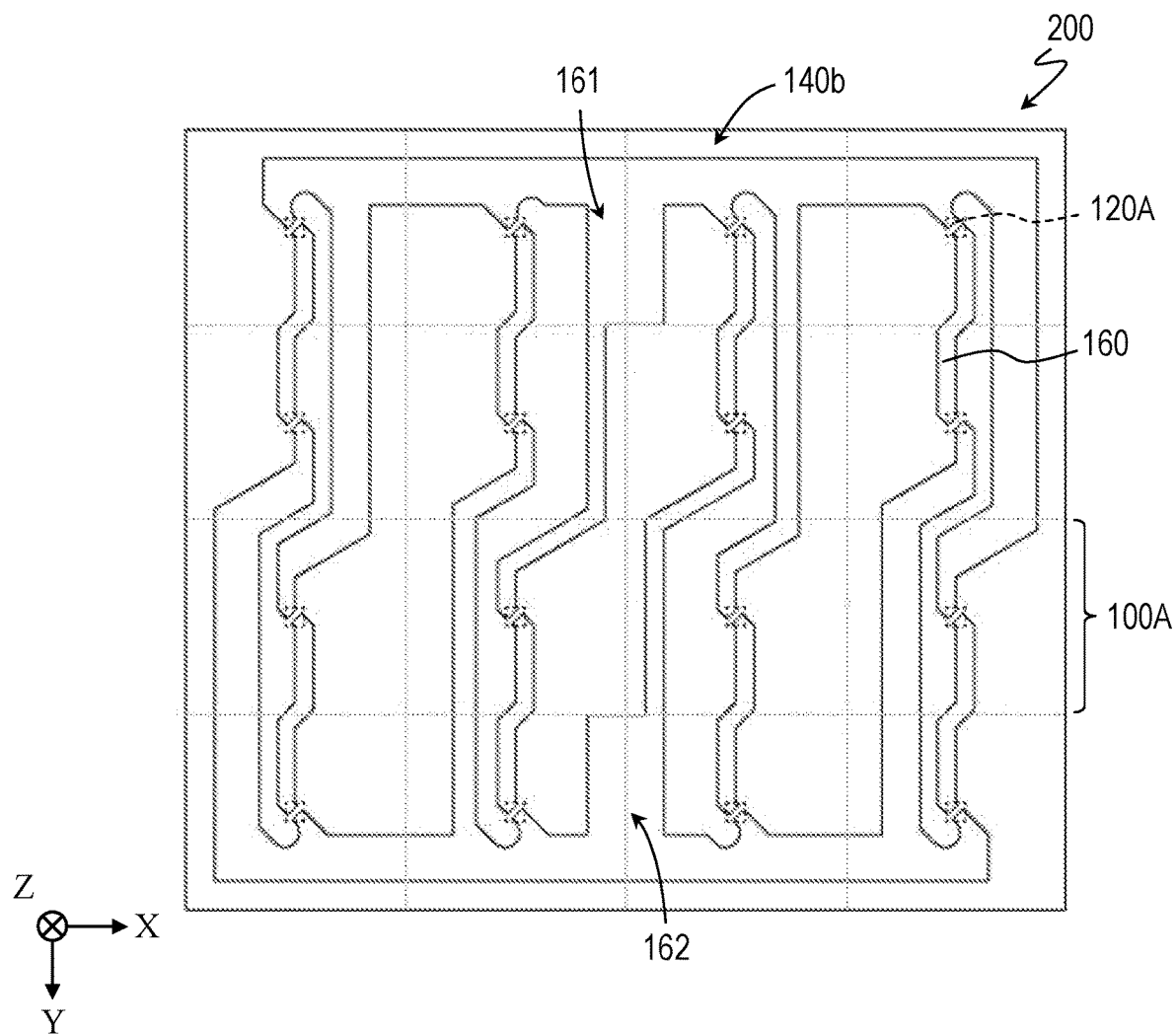
FIG. 9 is a schematic top view showing an exemplary external appearance of the light-emitting module shown in FIG. 1 as viewed from the lower surface side opposite to the upper surface of the lightguide plate.

FIG. 9 shows an example of the external appearance of the light-emitting module 200 shown in FIG. 1 as viewed from the lower surface side that is opposite to the upper surface 210a of the lightguide plate 210. In FIG. 9, for the sake of clarity, the boundaries between the plurality of light-emitting units 100A are represented by dotted lines, although it is not essential in an embodiment of the present disclosure that definite boundaries are formed between the plurality of light-emitting units 100A.

In the configuration illustrated in FIG. 9, the wiring layer 160 electrically couples the light-emitting elements 20 included in the light sources 120A of the respective light-emitting units 110A. The wiring pattern of the wiring layer 160 can be appropriately determined according to the driving method of the light-emitting module 200. In this example, 8 serial circuits, each including two serial connections of the light-emitting elements 20 which are arrayed in 4 rows and 4 columns, are connected in parallel. As a matter of course, the electrical connection of the plurality of light-emitting elements 20 is not limited to this example. For example, the circuity may be configured such that the plurality of light-emitting elements 20 in the light-emitting module 200 are divided into two or more groups, and respective ones of the groups are separately driven.

As described above, when the wiring layer 160 is provided on the lower surface side of the light-emitting unit 100A, it is easy to electrically couple together the plurality of light-emitting elements 20 in the light-emitting module 200, for example. Particularly, in the example shown in FIG. 9, the wiring layer 160 includes a positive electrode 161 and a negative electrode 162 which are formed as parts of relatively large areas. According to such a configuration, when the positive electrode 161 and the negative electrode 162 provided on the light-emitting module 200 side are electrically coupled with a driver on the substrate by soldering or the like, electrical connection between the plurality of light-emitting elements 20 in the light-emitting module 200 and the driver can be established without the necessity of forming a complicated wiring pattern on the substrate side which supports the light-emitting module 200.

Figure 10:
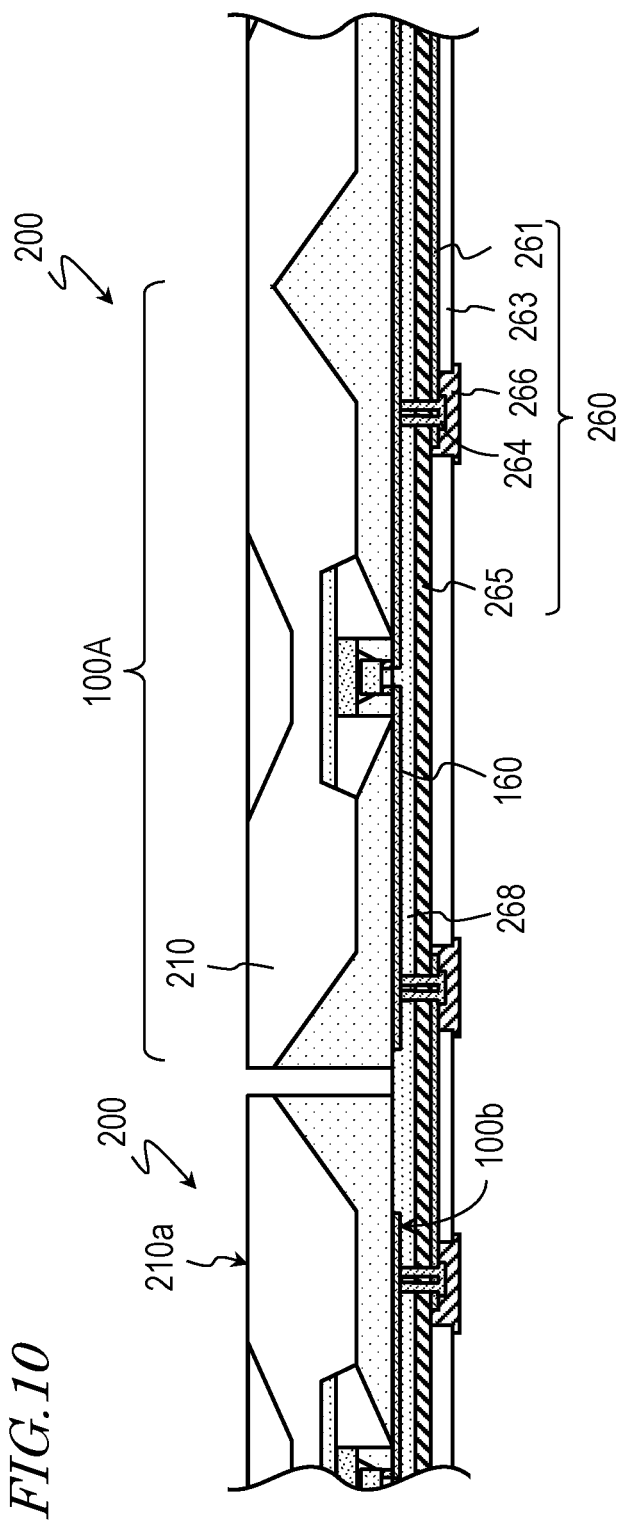
FIG. 10 is a schematic cross-sectional view showing an example where a light-emitting module is connected with a wiring board.

FIG. 10 shows an example where the light-emitting module 200 is connected with a wiring board. The light-emitting module of the present disclosure can include a wiring board 260 as illustrated in FIG. 10. The wiring board 260 is located at a side closer to the lower surface of the light-emitting module 200, i.e., on the side opposite to the upper surface 210a of the lightguide plate 210, and is connected with the wiring layer 160 of the light-emitting unit 100A.

In the configuration illustrated in FIG. 10, the wiring board 260 includes an insulating base 265, an wiring layer 261 provided on the insulating base 265, a covering layer 263, a plurality of vias 264, and protecting members 266. The wiring layer 261 is provided on one of the principal surfaces of the insulating base 265 which is opposite to the light-emitting unit(s) 100A. The covering layer 263 has a predetermined thickness and covers at least part of the wiring layer 261. The covering layer 263 has the function of protecting the wiring layer 261.

As shown in FIG. 10, herein, an adhesive sheet 268 which is made of a resin or the like is interposed between the light-emitting unit 100A and the wiring board 260. The light-emitting unit 100A is secured to the wiring board 260 by the adhesive sheet 268. As schematically shown in FIG. 10, each of the plurality of vias 264 penetrates through the insulating base 265 and electrically couples the above-described wiring layer 261 with the wiring layer 160 of the light-emitting unit 100A. The protecting members 266 are provided on a principal surface side of the insulating base 265 which is opposite to the light-emitting unit 100A so as to correspond to the plurality of vias 264. Each of the protecting members 266 protects corresponding one of the vias 264 and part of the wiring layer 261 lying around the periphery of the via 264.

For example, a driver for driving the light-emitting module 200 on the wiring board 260 is connected with the wiring layer 261 of the wiring board 260. As a result, electrical connection is established between the plurality of light-emitting elements 20 and the driver via the wiring layer 261 and the vias 264 of the wiring board 260. According to the present embodiment, the wiring layer 160 that has connection with each of the light-emitting elements 20 can be provided on the light-emitting module 200 side and, therefore, connections required for local dimming and the like can be easily formed without forming a complicated wiring pattern on the wiring board 260 side. The wiring layer 160 can have a larger area than the lower surface of the electrodes 20e of each of the light-emitting elements 20 and, therefore, formation of electrical connections with the wiring board 260 is relatively easy. When the light-emitting unit 100 does not include the wiring layer 160, the vias 264 of the wiring board 260 may be connected with the electrodes 20e of the light-emitting elements 20.

Thus, when the wiring layer 160 is provided on the lower surface 100b side of the light-emitting unit 100A, wires are formed on the light-emitting module 200 side that includes the plurality of light-emitting elements 20, and it is not necessary to form electrical connection with the wiring board 260 in each of the light-emitting elements 20. In other words, connection between the light-emitting module 200 or the light-emitting unit 100A and the power supply, or the like, is easily established. That is, by connecting the wiring board 260 that is connected with the power supply, or the like, with the light-emitting module 200, surface emission is easily realized. Particularly, as will be described later, a plurality of light-emitting modules 200 are combined together to form a larger surface-emission light source, and the plurality of light-emitting elements 20 are driven, for example, by the unit of the light-emitting module 200, so that a local dimming operation of this large-size surface-emission light source is realized. As a matter of course, a wiring pattern which allows the light-emitting elements 20 to be driven by the unit of one or more light-emitting units 100A may be applied to the wiring layer 160.

The arrangement pitch of the light-emitting elements 20 in each of the light-emitting units 100 can be, for example, not less than about 0.05 mm and not more than about 20 mm, and may be in the range of not less than about 1 mm and not more than about 10 mm. Herein, the arrangement pitch of the light-emitting elements 20 refers to the distance between the optical axes of the light-emitting elements 20. The light-emitting elements 20 may be arranged at regular intervals or may be arranged at irregular intervals. The arrangement pitch of the light-emitting elements 20 may be equal, or may be different, between two different directions.

Figure 11:
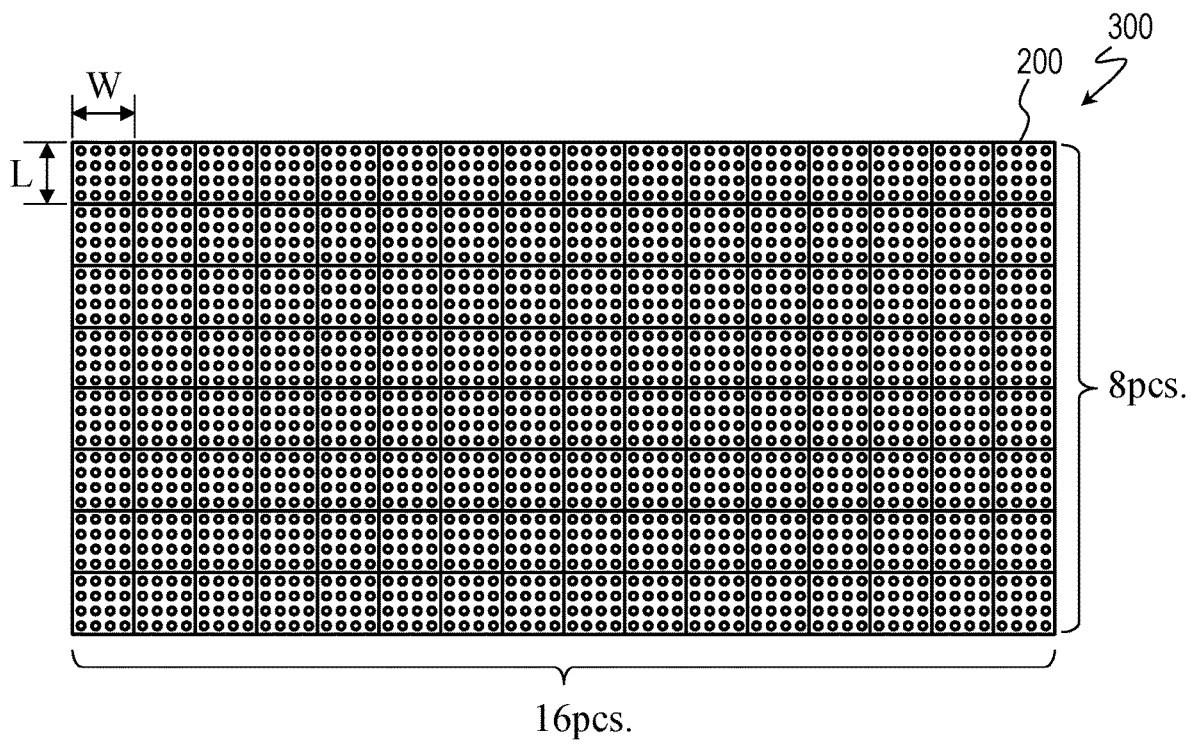
FIG. 11 is a schematic top view showing an example of a surface-emission light source which includes a two-dimensional array of a plurality of light-emitting modules.

FIG. 11 shows an example where a plurality of light-emitting modules 200 are two-dimensionally arrayed. By two-dimensionally arraying a plurality of light-emitting modules 200, a still larger emission surface can be realized.

A surface-emission light source 300 shown in FIG. 11 includes a plurality of sets of the light-emitting module 200 shown in FIG. 1. In the example shown in FIG. 11, the light-emitting modules 200 are arrayed in 8 rows and 16 columns. FIG. 11 schematically shows an external appearance of the two-dimensional array of the light-emitting modules 200 as viewed from the upper surface 210a side of the lightguide plate 210. Herein, the shape of the upper surface 210a of each lightguide plate 210 as viewed in a direction normal to the upper surface 210a of the lightguide plate 210 is rectangular. The aggregate of the upper surfaces 210a of the lightguide plates 210, which serves as the emission surface of the surface-emission light source 300, also has, as a whole, a rectangular shape. The surface-emission light source 300 may further include an optical sheet such as diffuser sheet, prism sheet, or the like, above the lightguide plate 210.

The lightguide plates 210 of two light-emitting modules 200 which are adjoining each other in the row or column direction are typically in direct contact with each other. However, it is not essential that a two-dimensional array is formed such that the lightguide plates 210 of two adjoining light-emitting modules 200 are in direct contact with each other. A lightguide structure may be interposed between two adjoining lightguide plates 210 such that the lightguide structure optically couples together the two adjoining lightguide plates 210. Such a lightguide structure can be formed by, for example, applying a light-transmitting adhesive onto the lateral surface(s) of the lightguide plates 210 and then curing the applied adhesive. Alternatively, the lightguide structure may be formed by two-dimensionally arraying a plurality of light-emitting modules 200 with gaps therebetween, filling the gaps between two adjoining lightguide plates 210 with a light-transmitting resin material, and thereafter curing the resin material. The material of the lightguide structure provided between the lightguide plates 210 can be the same as the material of the previously-described light-transmitting adhesive member 24. Using a material having a refractive index equal to or higher than the material of the lightguide plate 210 as the base material of the lightguide structure is beneficial. The lightguide structure provided between the lightguide plates 210 may have a light diffusion function.

When the longitudinal length L and the transverse length W of each light-emitting module 200 are, for example, about 24.3 mm and about 21.5 mm, respectively, the array of light-emitting modules 200 shown in FIG. 11 is suitable for a 15.6-inch screen size with an aspect ratio of 16:10. For example, the surface-emission light source 300 shown in FIG. 11 can be suitably used for the backlight unit of a laptop computer having a 15.6-inch screen size.

In this example, an aggregate of the upper surfaces 210a of the lightguide plates 210, which is the upper surface of each light-emitting module 200, forms an emission surface. Therefore, by changing the number of light-emitting modules 200 included in the surface-emission light source 300 or by changing the arrangement of the light-emitting modules 200, the surface-emission light source 300 can be readily applied to a plurality of types of liquid crystal panels of different screen sizes. That is, there is no need to redo the optical calculations for the lightguide plate 210 included in the light-emitting module 200 or to remake a mold for formation of the lightguide plate 210, and it is possible to flexibly conform to changes in the screen size. Therefore, changing the screen size will not incur an increase in the manufacturing cost and the lead time.

Figure 12:
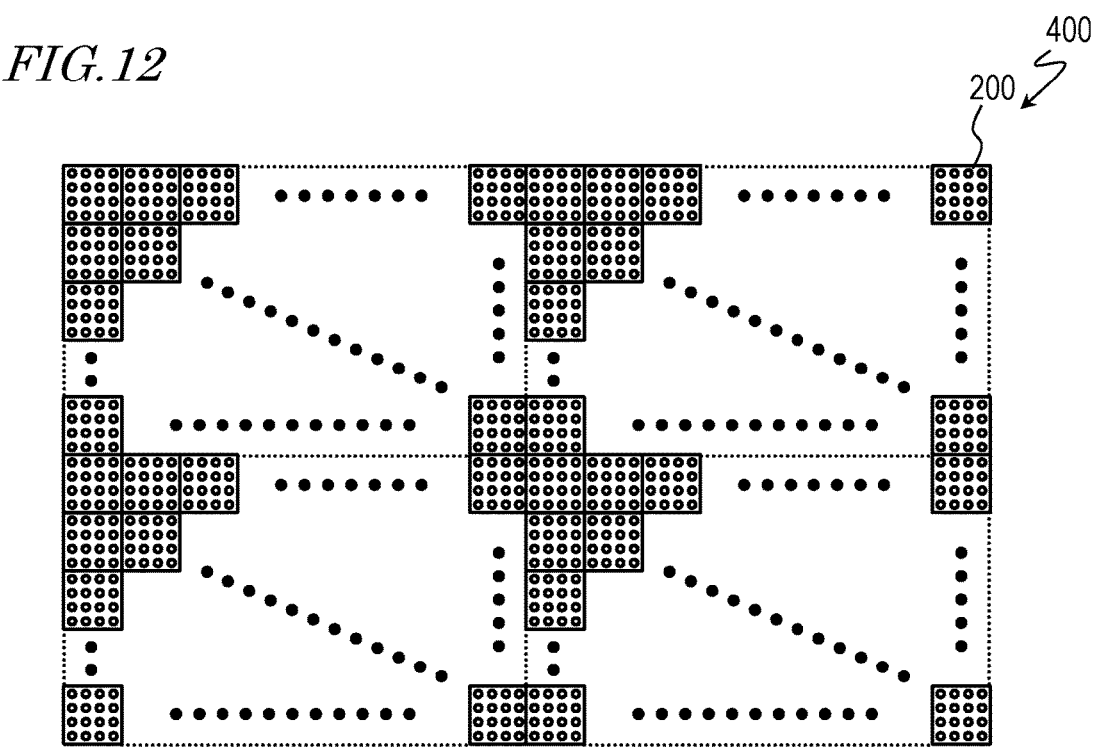
FIG. 12 is a schematic top view showing a configuration where sets of the plurality of light-emitting modules shown in FIG. 11 are arrayed in 2 rows and 2 columns.

FIG. 12 shows a configuration where a plurality of sets of the light-emitting modules 200 shown in FIG. 11 are arrayed in two rows and two columns. In this case, a total of 512 light-emitting modules 200 can together form a surface-emission light source 400 that is compatible with a 31.2-inch screen size with an aspect ratio of 16:10. For example, the array of the light-emitting modules 200 shown in FIG. 12 can be used as the backlight unit of a liquid crystal television, etc. Thus, according to the present embodiment, it is relatively easy to obtain a still larger emission surface.

According to the method of forming a still larger emission surface by a combination of a plurality of light-emitting modules 200, it is possible to flexibly conform to liquid crystal panels of a variety of screen sizes without the necessity of re-designing the optical system or remaking a mold for formation of the lightguide plate in consideration of the screen size. That is, it is possible to produce a backlight unit that is compatible with a certain screen size at a low cost and within a short period of time. Another advantage is that even if there is a light-emitting element that cannot be lit due to a break in a wire, or the like, it is possible to simply replace a light-emitting module that includes the inoperative light-emitting element.

Figure 13:
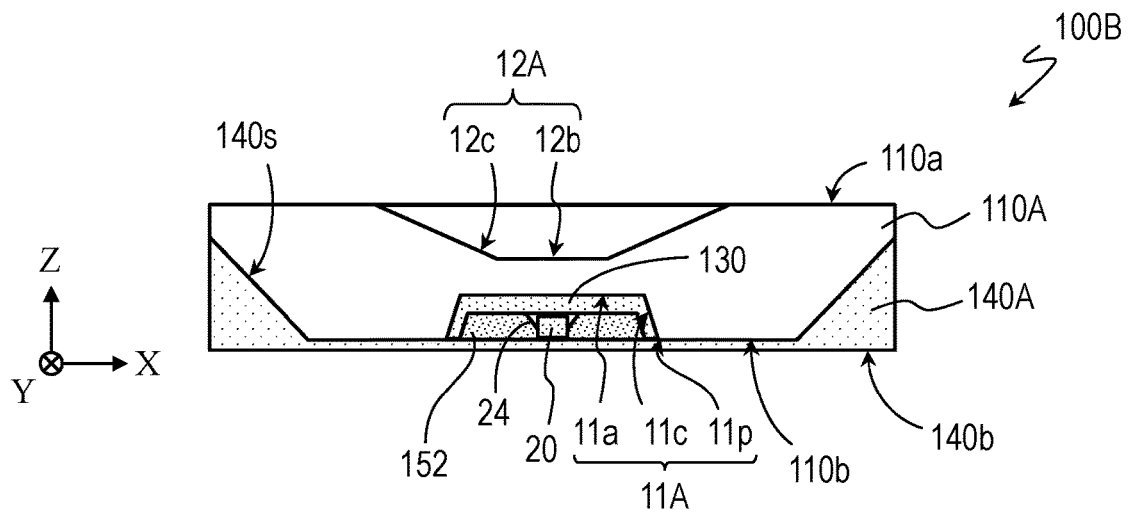
FIG. 13 is a schematic cross-sectional view of a light-emitting module according to another embodiment of the present disclosure.
Figure 14:
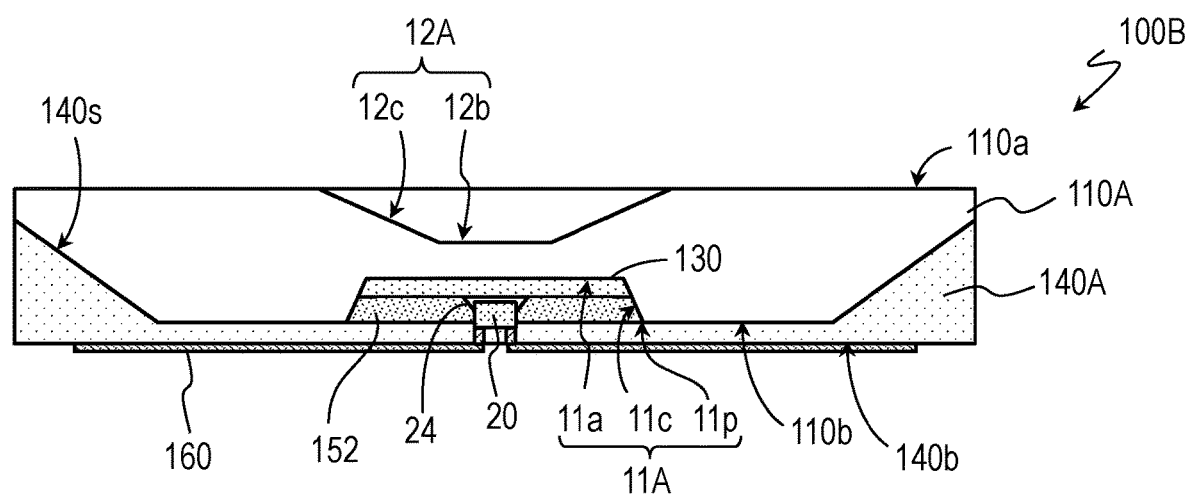
FIG. 14 is another cross-sectional view of the light-emitting unit shown in FIG. 13.

FIG. 13 and FIG. 14 schematically show cross sections of a light-emitting module of another embodiment of the present disclosure. The light-emitting unit 100B shown in FIG. 13 and FIG. 14 is another example of the light-emitting units 100 that have previously been described with reference to FIG. 1. FIG. 13 shows a schematic cross section of the light-emitting unit 100B shown in the same manner as the cross-sectional view shown in the lower part of FIG. 2, taken along a plane perpendicular to the upper surface 210a of the lightguide plate 210 near the center of the light-emitting unit 100B. FIG. 14 shows another schematic cross section of the light-emitting unit 100B taken along a diagonal line of the rectangular shape of the lightguide plate 210 as does FIG. 3.

In the light-emitting unit 100B of the present embodiment, the light-emitting element 20 is joined to the light diffusing layer 130 with the light-transmitting adhesive member 24, whereas in the light-emitting unit 100A shown in FIG. 2 and FIG. 3, the light source 120A includes the light-emitting element 20 and the light-transmitting member 22 as a part of the light source 120A, and the light source 120A is positioned in the first hole portion 11A.

In the light-emitting unit 100B, a light-transmitting member 152 is supplied in the inner space of the first hole portion 11A, exclusive of the light-emitting element 20, the light-transmitting adhesive member 24 and the light diffusing layer 130. As shown in FIG. 14, in this example, the light-reflective member 140A covers the lower surface 110b of the lightguide plate 110A, the light-transmitting member 152, and the lower surface of the light-emitting element 20 located opposite to the upper surface 110a of the lightguide plate 110A, exclusive of the electrodes 20e of the light-emitting element 20.

The light-transmitting member 152 typically covers at least part of the lateral surfaces of the light-emitting element 20. Large part of the light emitted from the lateral surfaces of the light-emitting element 20 is repeatedly reflected between the light diffusing layer 130 and the light-reflective member 140A and brought into the lightguide plate 110A via the lateral surfaces 11c of the first hole portion 11A. The light-transmitting member 152 can contain phosphor particles as does the light-transmitting member 22. In this case, light that has been wavelength-converted by the light-transmitting member 152 (e.g., yellow light) and blue light from the light-emitting element 20 are mixed together and brought into the lightguide plate 110A, resulting in more uniform white light as compared with a case where light is diffused in the lightguide plate prior to wavelength conversion. Thus, part or the entirety of the lateral surfaces of the light-emitting element 20 may be covered with the light-transmitting member 152.

The light-transmitting member 152 can be formed of, for example, a resin material in which particles of a phosphor or the like are dispersed in a resin. After the light diffusing layer 130 is formed in the first hole portion 11A and the light-emitting element 20 is joined to the light diffusing layer 130 with the light-transmitting adhesive member 24, the material of the light-transmitting member 152 is supplied in the first hole portion 11A by potting or the like. Thereafter, the material supplied in the first hole portion 11A is cured, whereby the light-transmitting member 152 can be formed in the first hole portion 11A so as to cover the lateral surfaces of the light-emitting element 20. In this process, by adjusting the amount and viscosity of the material of the light-transmitting member 152 supplied in the first hole portion 11A, the surface of the light-transmitting member 152 can be made substantially coplanar with the lower surface 110b of the lightguide plate 110A.

Figure 15:
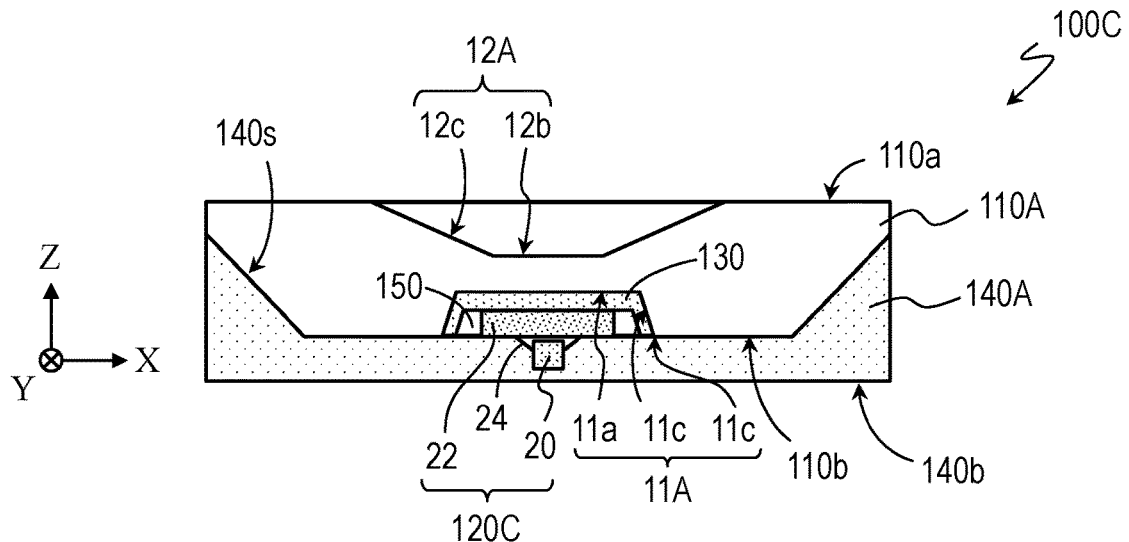
FIG. 15 is a schematic cross-sectional view of a light-emitting module according to still another embodiment of the present disclosure.
Figure 16:
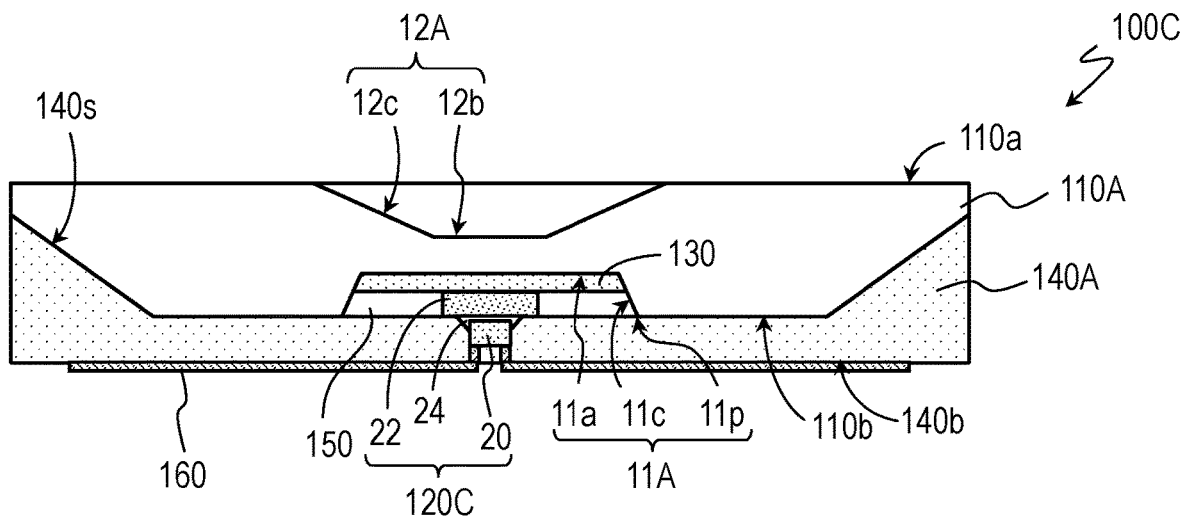
FIG. 16 is another cross-sectional view of the light-emitting unit shown in FIG. 15.

FIG. 15 and FIG. 16 schematically show cross sections of a light-emitting module of still another embodiment of the present disclosure. The light-emitting unit 100C shown in FIG. 15 and FIG. 16 is still another example of the light-emitting units 100 that have previously been described with reference to FIG. 1. FIG. 15 and FIG. 16 are schematic cross-sectional views shown in the same manner as the lower part of FIG. 2 and FIG. 3, and as are FIG. 13 and FIG. 14.

In comparison with the light-emitting unit 100A that has previously been described with reference to FIG. 2 and FIG. 3, the light-emitting unit 100C includes a light source 120C in place of the light source 120A. The light source 120C includes a plate-like light-transmitting member 22, a light-transmitting adhesive member 24, and a light-emitting element 20. The light-emitting element 20 is fixed with the light-transmitting adhesive member 24 to a principal surface (lower surface) of the light-transmitting member 22 which is opposite to the lightguide plate 110A. In comparison with the above-described light source 120A, the light source 120C does not include the cover member 26. Herein, an approximate entirety of the light-emitting element 20, exclusive of the lower surface of the electrodes 20e, is covered with the light-reflective member 140A.

In comparison with the light-emitting unit 100B shown in FIG. 13 and FIG. 14, the light-emitting unit 100C is configured such that the light-transmitting member 22 is present on the light diffusing layer 130. That is, likewise as in the previously-described examples, the light diffusing layer 130 includes a portion which is present between the bottom surface 11a of the first hole portion 11A and the light-transmitting member 22. The inner space of the first hole portion 11A, exclusive of the light-transmitting member 22 and the light-transmitting adhesive member 24, is occupied by the second light-transmitting member 150.

In the present embodiment, light emitted from the light-emitting element 20 enters the light-transmitting member 22 via the light-transmitting adhesive member 24. The light that has entered the light-transmitting member 22 is repeatedly reflected between the light diffusing layer 130 and the light-reflective member 140A and brought into the lightguide plate 110A via the lateral surfaces 11c of the first hole portion 11A.

The light-emitting unit 100C can be realized by, for example, placing the light source 120C in the first hole portion 11A, forming the second light-transmitting member 150 in the remaining space of the first hole portion 11A, and thereafter forming the light-reflective member 140A on the lower surface 110b side of the lightguide plate 110A. While the light source 120C is placed in the first hole portion 11A, part of the light source 120C can protrude from the first hole portion 11A of the lightguide plate 110A.

Figure 17:
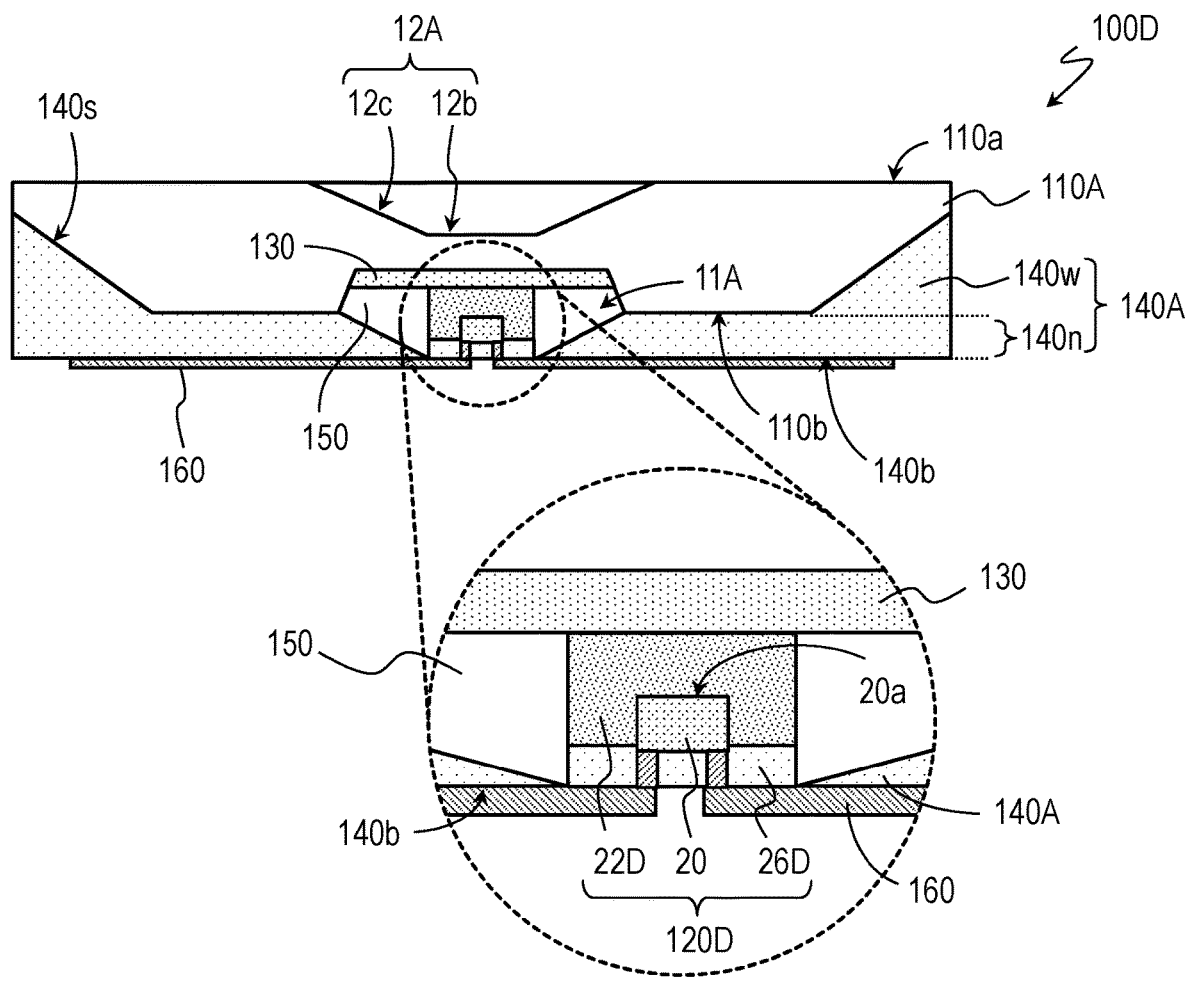
FIG. 17 schematically shows a cross section of a light-emitting unit according to still another embodiment of the present disclosure.

The configuration of the plurality of light sources applied to the light-emitting module is not limited to the above-described examples of the light source 120A and the light source 120C but can have various forms as will be described below. FIG. 17 schematically shows a cross section of a light-emitting unit of still another embodiment of the present disclosure. The light-emitting unit 100D shown in FIG. 17 includes a light source 120D provided on the lower surface 110b side of the lightguide plate 110A. FIG. 17 shows, together in a single drawing, the cross section of the light-emitting unit 100D and an enlarged schematic cross-sectional view of the light source 120D and its surroundings.

The light source 120D includes a light-emitting element 20, a light-transmitting member 22D, and a cover member 26D. As enlargedly shown in FIG. 17, in this example, the light-transmitting member 22D covers not only the upper surface 20a of the light-emitting element 20 but also part of the lateral surfaces of the light-emitting element 20. The cover member 26D covers the light-emitting element 20 at a surface of the light-transmitting member 22D which is opposite to the light diffusing layer 130. Likewise as in the light source 120A, the lower surface of the electrodes of the light-emitting element 20 is exposed from the cover member 26D. The electrodes of the light-emitting element 20 are connected with the wiring layer 160.

The light source 120D can be, for example, prepared as follows. The same material as the previously-described material of the light-transmitting member 22 is kept semi-cured state, and part of the main body of the light-emitting element 20 is buried in the semi-cured material. The material in which the light-emitting element 20 is partially buried is cured, thereafter the electrode-side surface of the light-emitting element 20 is covered with the same light-reflective material as the material of the cover member 26, and the material applied to the electrode-side surface of the light-emitting element 20 is cured. Thereafter, a structure body in which the resin material and the light-emitting element 20 are integrated is processed into a predetermined shape by cutting, grinding, or the like. Thereby, the lower surface of the electrodes of the light-emitting element 20 is exposed from the cover member 26D, while the shape of the light-transmitting member 22D covering at least part of the lateral surfaces of the light-emitting element 20 is realized. Note that formation of the cover member 26D may be omitted. For example, after the light source is placed in the first hole portion 11A, the light-reflective member 140A may be formed so as to cover a portion of the light-emitting element 20 where the light-transmitting member 22D is not covered.

Figure 18:
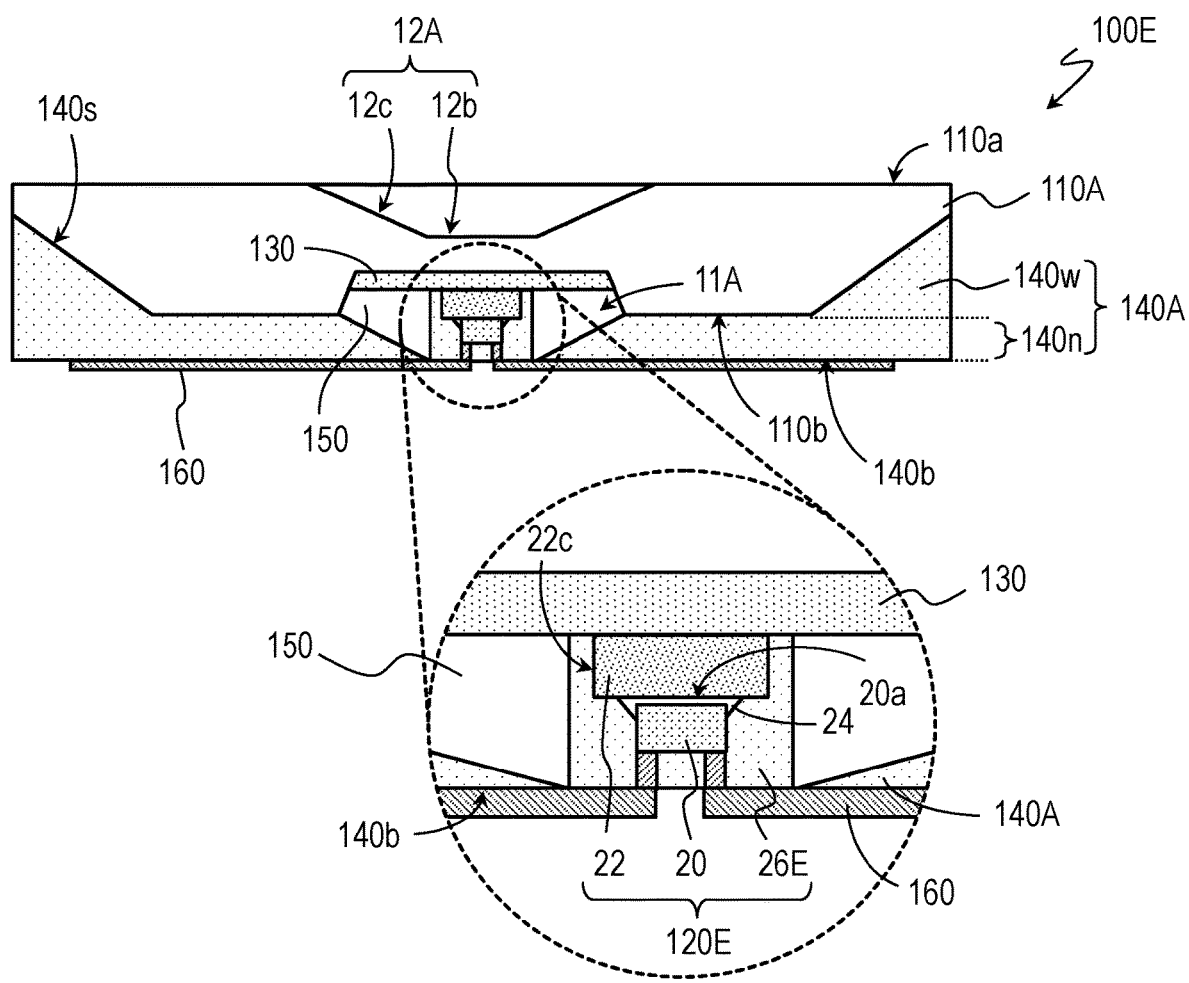
FIG. 18 is a schematic cross-sectional view for illustrating still another example of a light source which is applicable to the light-emitting module.

FIG. 18 shows still another example of a light source which is applicable to the light-emitting module. The light-emitting unit 100E shown in FIG. 18 includes a light source 120E provided on the lower surface 110b side of the lightguide plate 110A. The light source 120E includes a cover member 26E in addition to the light-emitting element 20 and the light-transmitting member 22.

As enlargedly shown in FIG. 18, in this example, the cover member 26E covers not only part of the lateral surfaces of the light-emitting element 20 and the external surface of the light-transmitting adhesive member 24 but also the lateral surfaces 22c of the light-transmitting member 22. The light source 120E shown in FIG. 18 is, for example, produced as follows. Firstly, the light-emitting element 20 is joined to the lower surface of the light-transmitting member 22 by the light-transmitting adhesive member 24 and, thereafter, a structure body in which the light-transmitting member 22 and the light-emitting element 20 are integrated is covered with a light-reflective material. After the light-reflective material is cured, a resin body formed by curing the light-reflective material is processed by grinding, or the like, such that the lower surface of the electrodes of the light-emitting element 20 is exposed from the surface of the resin body. Thereafter, the resin body is cut into a desired shape, whereby the light source 120E is produced.

The light source 120A shown in FIG. 8 can also be produced by the same method as that employed for the light source 120E. For example, a plate-like resin layer which is formed of the material of the light-transmitting member 22 is prepared and, on this resin layer, a plurality of light-emitting elements 20 are two-dimensionally arrayed via the light-transmitting adhesive member 24. A light-reflective resin layer is formed on the resin layer so as to cover the plurality of light-emitting elements 20, and the lower surfaces of the electrodes of the light-emitting elements 20 are exposed from the light-reflective resin layer. Thereafter, the multilayer structure of the resin layers is cut at positions between the plurality of light-emitting elements 20, so that the plurality of light sources 120A can be efficiently produced.

Figure 19:
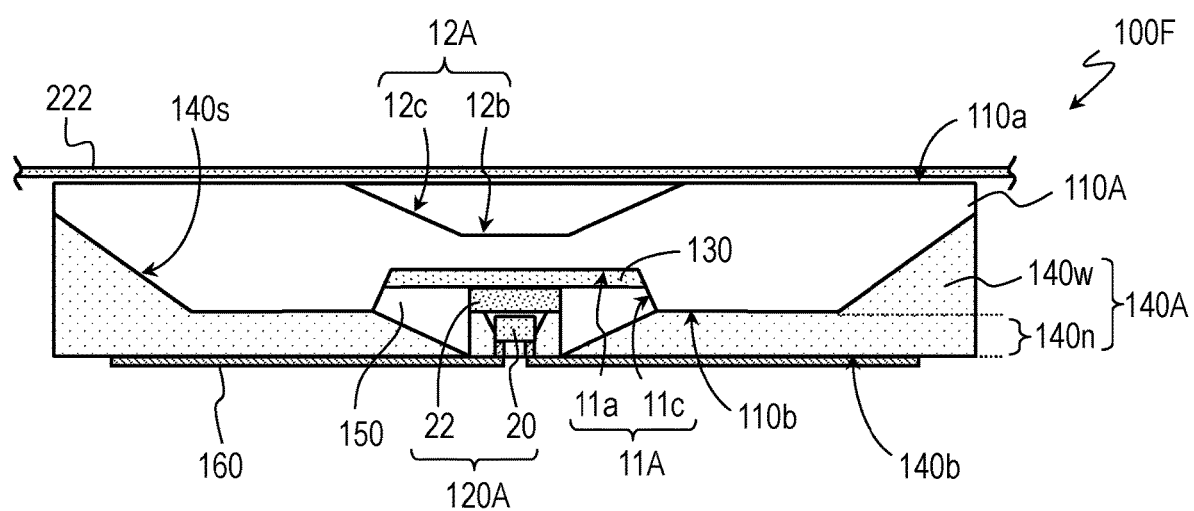
FIG. 19 is a schematic cross-sectional view of a light-emitting module according to still another embodiment of the present disclosure.

FIG. 19 schematically shows a cross section of a light-emitting module of still another embodiment of the present disclosure. The light-emitting unit 100F shown in FIG. 19 includes a lightguide plate 110A, a light source 120A provided on the lower surface 110b side of the lightguide plate 110A, and a wavelength conversion sheet 222.

In the configuration illustrated in FIG. 19, the wavelength conversion sheet 222 is located over the upper surface 110a of the lightguide plate 110A. The wavelength conversion sheet 222 may be in contact with the upper surface 110a of the lightguide plate 110A or may be provided above the lightguide plate 110A so as to be apart from the upper surface 110a of the lightguide plate 110A. The wavelength conversion sheet 222 can be provided above the lightguide plate 110A so as to extend across one or a plurality of light-emitting modules 200. When an optical sheet, such as a diffuser sheet, prism sheet, or the like, is further provided above the lightguide plate 110A, it is preferred that the diffuser sheet, the wavelength conversion sheet 222, and the prism sheet are provided, in this order from the side closer to the upper surface 110a, above the lightguide plate 110A. That is, it is preferred that the diffuser sheet is present between the upper surface 110a of the lightguide plate 110A and the wavelength conversion sheet 222 while the wavelength conversion sheet 222 is present between the diffuser sheet and prism sheet.

The wavelength conversion sheet 222 is, typically, a resin in the shape of a sheet in which phosphor particles are dispersed. Using the wavelength conversion sheet 222 enables a uniform distribution of the phosphor particles above the lightguide plate 110A. The same effect can be achieved also when a lightguide plate 110B which will be described later is used in place of the lightguide plate 110A.

The light-emitting unit 100F includes the wavelength conversion sheet 222. Therefore, in such a configuration, it is not essential that the light-transmitting member 22 contains a phosphor or the like.

Figure 20:
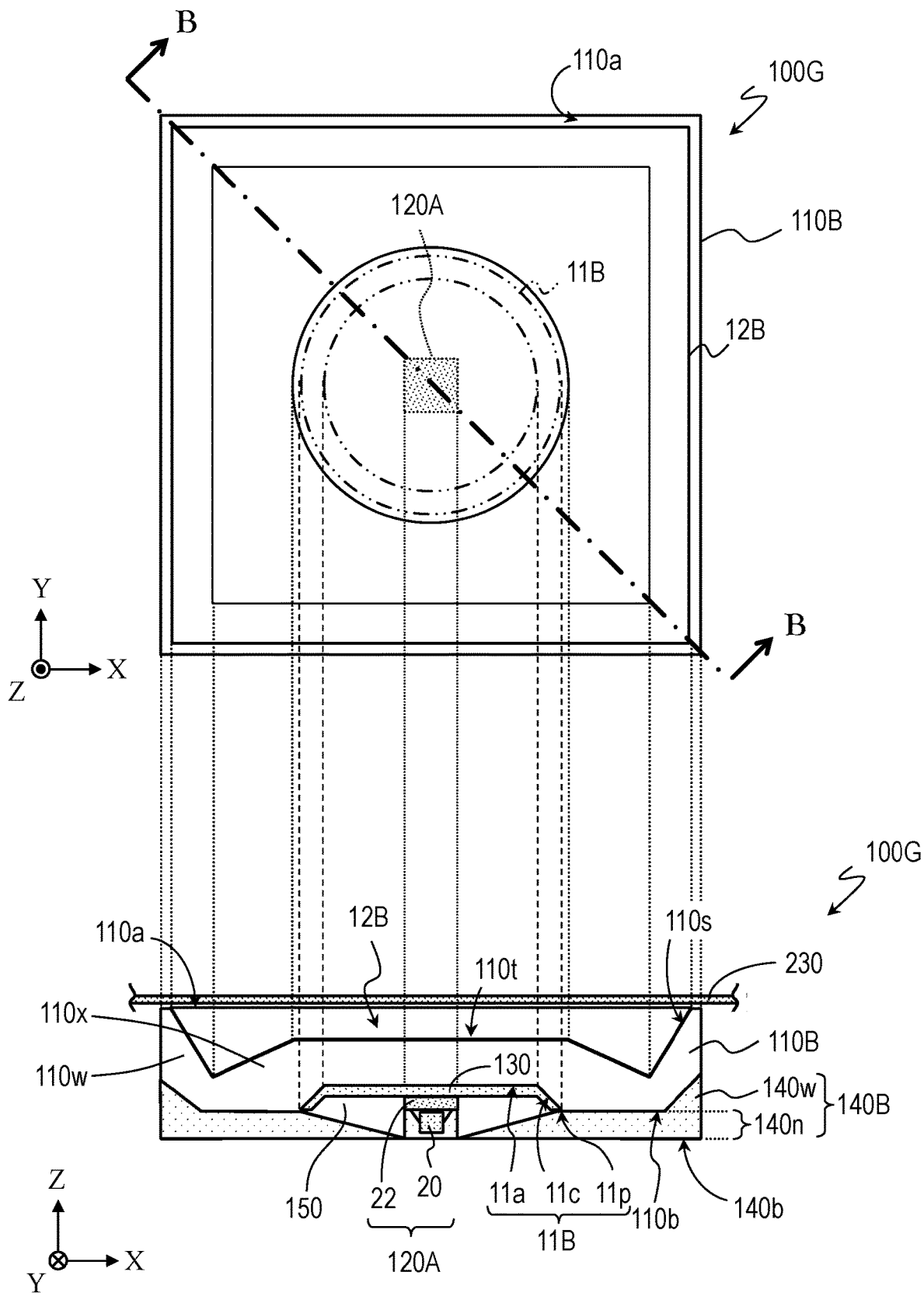
FIG. 20 is a schematic cross-sectional view of a light-emitting module according to still another embodiment of the present disclosure, and schematically shows an exemplary external appearance of the light-emitting unit as viewed from the upper surface side of the lightguide plate and a cross section of the light-emitting unit taken along a plane parallel to ZX plane near the center of the light-emitting unit.
Figure 21:
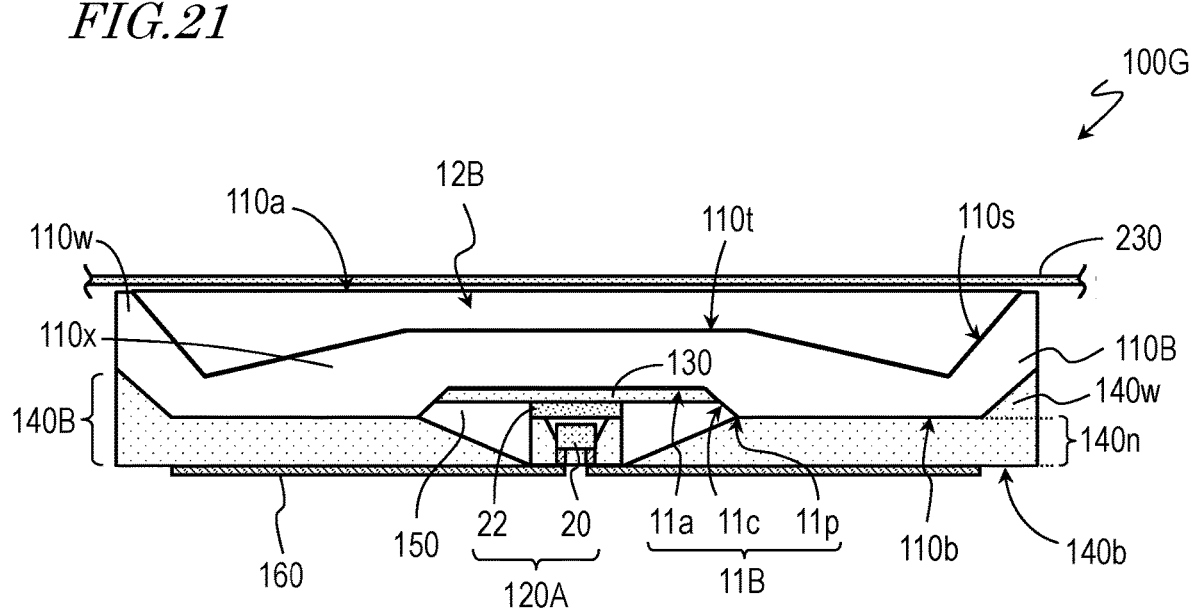
FIG. 21 is another cross-sectional view of the light-emitting unit shown in FIG. 20.

FIG. 20 and FIG. 21 schematically show cross sections of a light-emitting module of still another embodiment of the present disclosure. The light-emitting unit 100G shown in FIG. 20 and FIG. 21 is still another example of the light-emitting units 100 that have previously been described with reference to FIG. 1. FIG. 20 schematically shows, as FIG. 2 does, together in a single drawing, an external appearance of the light-emitting unit 100G as viewed from the upper surface 110a side of the lightguide plate 110B and a cross section of the light-emitting unit 100G taken along a plane perpendicular to the upper surface 110a of the lightguide plate 110B near the center of the light-emitting unit 100G. FIG. 21 shows a schematic cross section of the light-emitting unit 100G taken along line B-B of FIG. 20.

In comparison with the light-emitting unit 100A shown in FIG. 2 and FIG. 3, the light-emitting unit 100G of the present embodiment includes a lightguide plate 110B and a light-reflective member 140B in place of the lightguide plate 110A and the light-reflective member 140A. As understood from the lower part of FIG. 20 and FIG. 21, the light-reflective member 140B is located at a side closer to the lower surface 110b of the lightguide plate 110B and includes a layer-shaped basal portion 140n and a wall portion 140w raised toward the upper surface 110a of the lightguide plate 110B as does the light-reflective member 140A shown in FIG. 2.

The lightguide plate 110B has a first hole portion 11B on the lower surface 110b side and a second hole portion 12B on the upper surface 110a side. In the configuration illustrated in FIG. 20 and FIG. 21, the first hole portion 11B has a truncated cone shape which is defined by the bottom surface 11a and the lateral surface 11c. In the first hole portion 11B, the light diffusing layer 130 is provided.

The lightguide plate 110B includes a truncated cone portion 110x and a wall portion 110w surrounding the truncated cone portion 110x. The truncated cone portion 110x has a top surface 110t located on the side opposite to the lower surface 110b. In this example, the top surface 110t of the truncated cone portion 110x has a circular shape. The top surface 110t faces the bottom surface 11a of the first hole portion 11B, and the center of the circular shape of the top surface 110t is substantially coincident with the center of the circular shape of the bottom surface 11a. As shown in the lower part of FIG. 20 and FIG. 21, the top surface 110t of the truncated cone portion 110x is located lower than the highest part of the wall portion 110w, i.e., the position of the upper surface 110a of the lightguide plate 110B.

The wall portion 110w has a shape which spreads wide from the position of the bottom of the truncated cone portion 110x toward the rectangular opening of the second hole portion 12B. Therefore, the inside of the second hole portion 12B has four slope surfaces 110s which surround the truncated cone portion 110x. Light that has traveled through the inside of the lightguide plate 110B and has been emitted from the surface of the truncated cone portion 110x is reflected at the positions of the slope surfaces 110s so as to travel upward from the lightguide plate 110B.

As shown in the lower part of FIG. 20 and FIG. 21, a light diffuser sheet 230 can be provided above the lightguide plate 110B so as to extend across one or a plurality of light-emitting modules 200. The lower surface of the light diffuser sheet 230 which faces the lightguide plate 110B may be in contact with, or may not be in contact with, the upper surface 110a of the lightguide plate 110B. Inside the second hole portion 12B, a medium having a lower refractive index than the lightguide plate 110B is provided. Such a medium is typically air. A large portion of light emitted from the lightguide plate 110B is repeatedly reflected between the lightguide plate 110B and the light diffuser sheet 230 and thereafter diffusedly emitted from the upper surface side of the light diffuser sheet 230. Due to the repeated reflection between the lightguide plate 110B and the light diffuser sheet 230, light further improved uniformity can be achieved. As the light diffuser sheet 230, a known optical element which is commercially available under the name of "light diffuser film", or the like, can be used.

Figure 22:
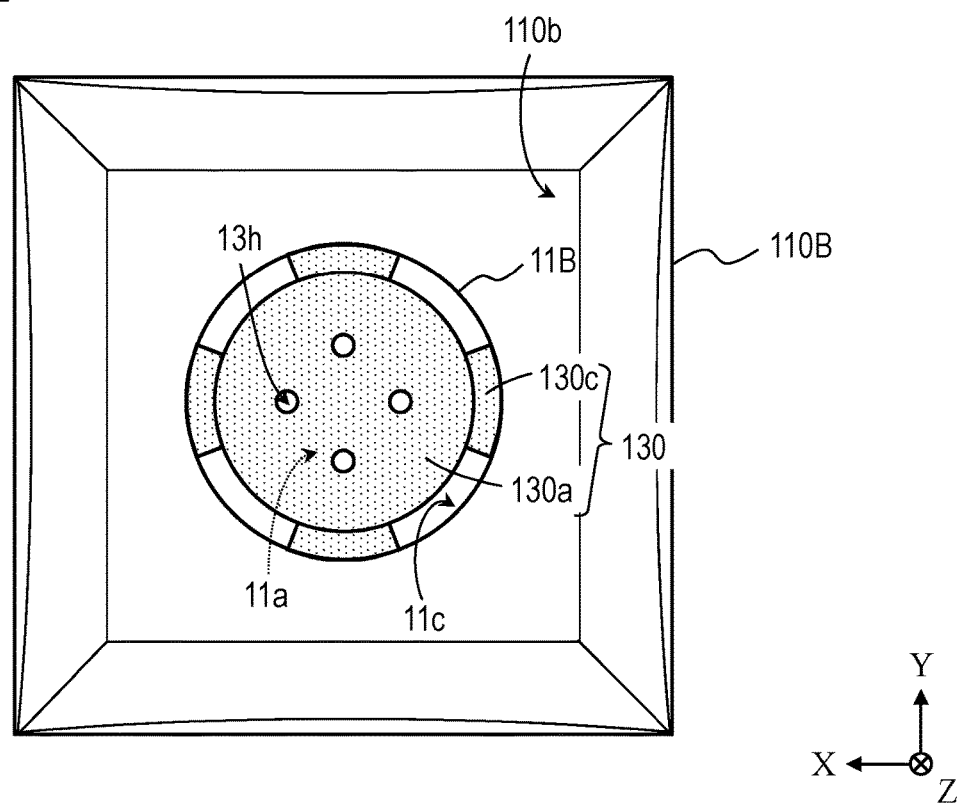
FIG. 22 is a schematic top view showing another exemplary shape of a light diffusing layer as viewed from the lower surface side of the lightguide plate.

FIG. 22 schematically shows an exemplary shape of the light diffusing layer 130 as viewed from the lower surface 110*b* side of the lightguide plate 110B. In this example, the first hole portion 11B has a bottom surface 11*a* and a single lateral surface 11*c*. In the configuration illustrated in FIG. 22, the light diffusing layer 130 includes a first portion 130*a* located on the bottom surface 11*a* of the first hole portion 11B and four second portions 130*c* each covering part of the lateral surface 11*c*.

Likewise as in the example that has previously been described with reference to FIG. 4, the second portions 130*c* of the light diffusing layer 130 are not provided on regions of the lateral surface 11*c* of the first hole portion 11B which are present on the diagonal lines of the rectangular shape of the lightguide plate 110B. In other words, also in this example, the light diffusing layer 130 selectively covers portions of the lateral surface 11*c* that defines the shape of the first hole portion 11B rather than the entirety of the lateral surface 11*c*. Thus, the light which arrives at the corners of the rectangular shape of the lightguide plate 110B can be increased, and occurrence of luminance non-uniformity across the upper surface of the light diffuser sheet 230 can be suppressed.

Also in this example, the first portion 130*a* of the light diffusing layer 130 has a plurality of openings 13*h*. These openings 13*h* are provided at positions which overlap the light-transmitting member 22 of the light source 120A in the top view. As previously described with reference to FIG. 5, the bottom surface 11*a* of the first hole portion 11B may have pillars at the positions of the openings 13*h* of the light diffusing layer 130.

As understood from FIG. 20 and FIG. 21, the light source 120A is provided on the first portion 130*a* of the light diffusing layer 130. The area of the circular shape of the first portion 130*a* can be about twice the area of the upper surface of the light-transmitting member 22. Any of the above-described light sources 120C to 120E is applicable instead of the light source 120A. Alternatively, a light-transmitting member may be provided inside the first hole portion 11B so as to cover at least part of the lateral surfaces of the light-emitting element 20 likewise as in the example previously described with reference to FIG. 13 and FIG. 14.

Figure 23:
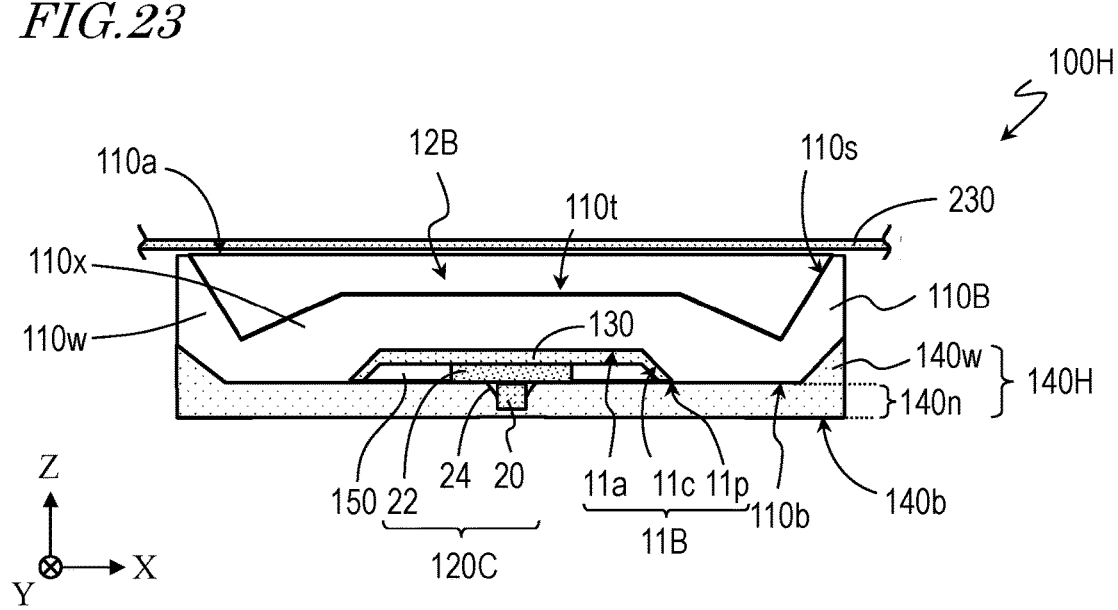
FIG. 23 is a schematic cross-sectional view of a light-emitting module according to still another embodiment of the present disclosure.
Figure 24:
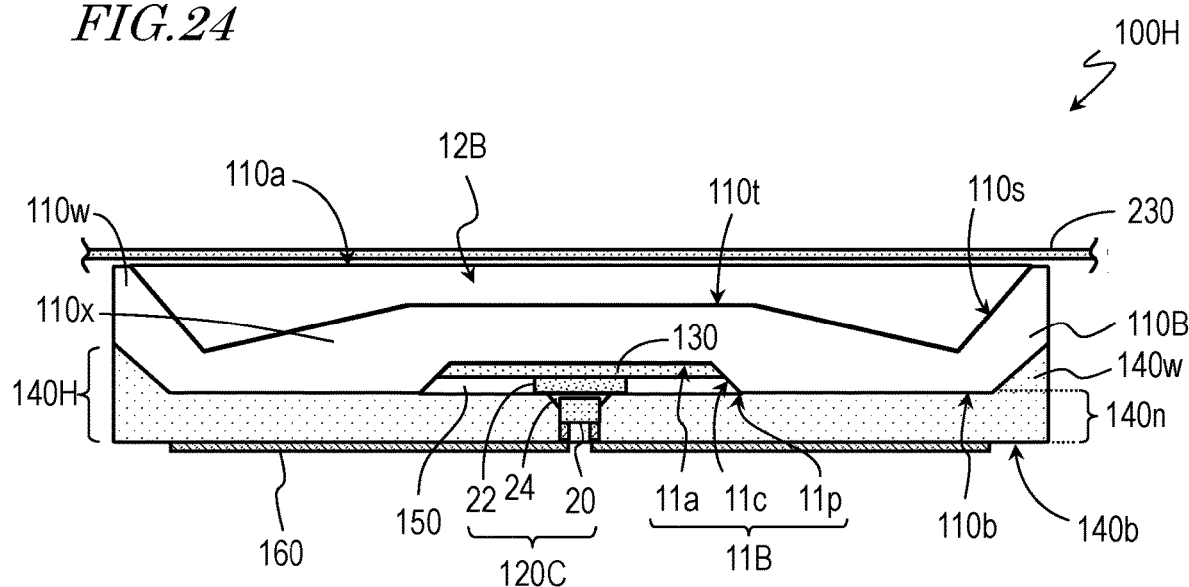
FIG. 24 is another cross-sectional view of the light-emitting unit shown in FIG. 23.

FIG. 23 and FIG. 24 schematically show cross sections of a light-emitting module of still another embodiment of the present disclosure. FIG. 23 and FIG. 24 are schematic cross-sectional views corresponding to the lower part of FIG. 2 and FIG. 3, respectively.

The differences between the light-emitting unit 100H shown in FIG. 23 and FIG. 24 and the light-emitting unit 100G previously described with reference to FIG. 20 and FIG. 21 reside in that the light-emitting unit 100H includes the light source 120C in place of the light source 120A and the light-emitting unit 100H includes a light-reflective member 140H in place of the light-reflective member 140B. As does the above-described light-reflective member 140B, the light-reflective member 140H also includes the layer-shaped basal portion 140*n* and the wall portion 140*w* raised toward the upper surface 110*a* of the lightguide plate 110B.

Even when the lightguide plate 110B is used in place of the lightguide plate 110A as in this example, such a configuration may be applied that the light-emitting element 20 is joined to the light-transmitting member 22 provided on the light diffusing layer 130. Note that, in this example, the light-reflective member 140H located on the lower surface 110*b* side of the lightguide plate 110B covers not only the lower surface 110*b* of the lightguide plate 110B and the surface of the second light-transmitting member 150 but also the lower surface of the light-emitting element 20 exclusive of the electrodes 20*e* that are located opposite to the light-transmitting member 22.

Figure 25:
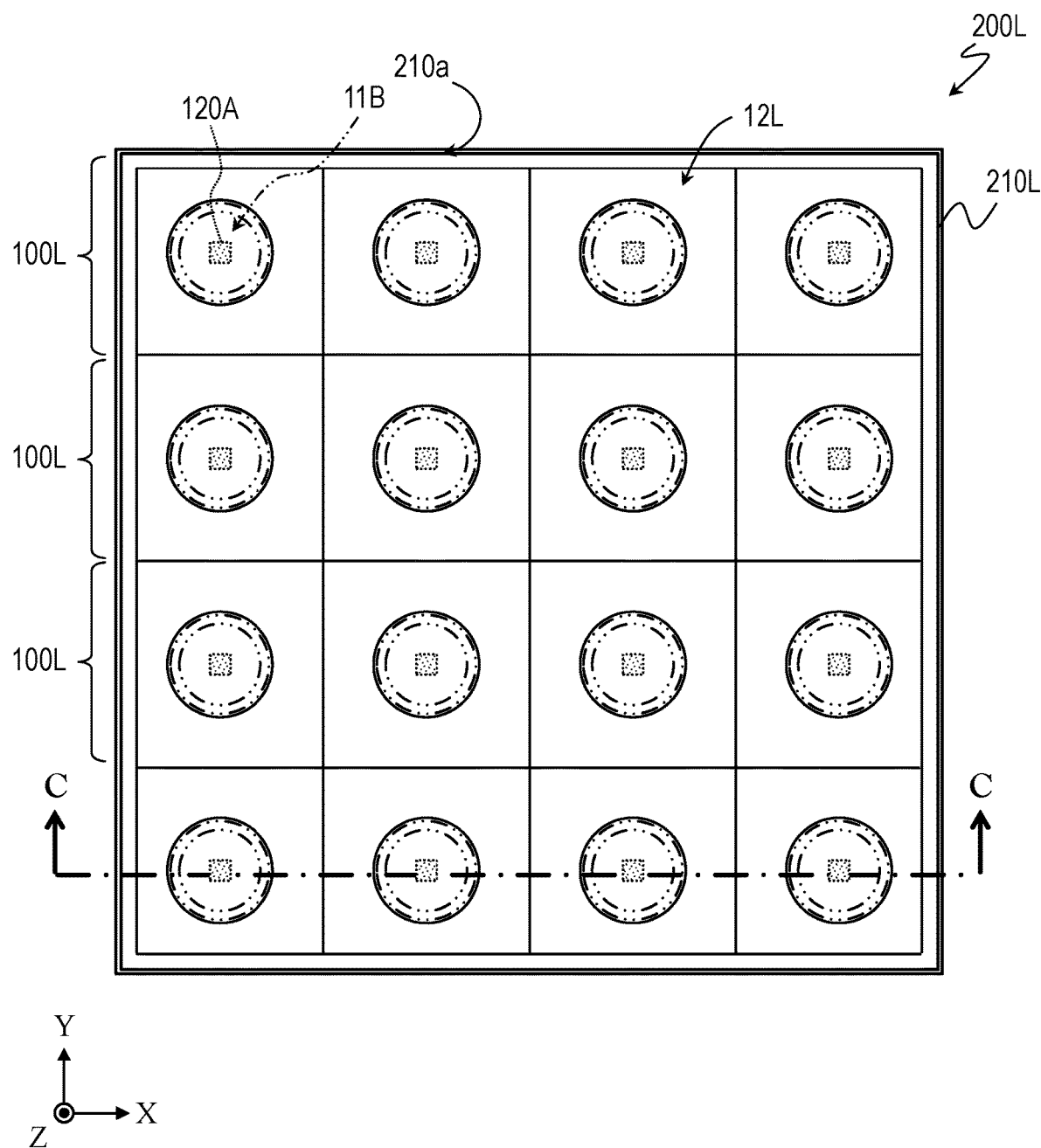
FIG. 25 shows a schematic external appearance of a light-emitting module according to still another embodiment of the present disclosure as viewed from the upper surface side.

FIG. 25 shows a schematic external appearance of a light-emitting module of still another embodiment of the present disclosure as viewed from the upper surface side. The light-emitting module 200L shown in FIG. 25 includes a lightguide plate 210L and a plurality of light sources 120A located on the lower surface side of the lightguide plate 210L. In the configuration illustrated in FIG. 25, the light-emitting module 200L includes a plurality of light-emitting units 100L, each of which includes a light source 120A, as does the light-emitting module 200 that has been previously described with reference to FIG. 1. In this example, the light-emitting module 200L includes an array of 16 light-emitting units 100L in total which are arrayed in 4 rows and 4 columns.

Figure 26:
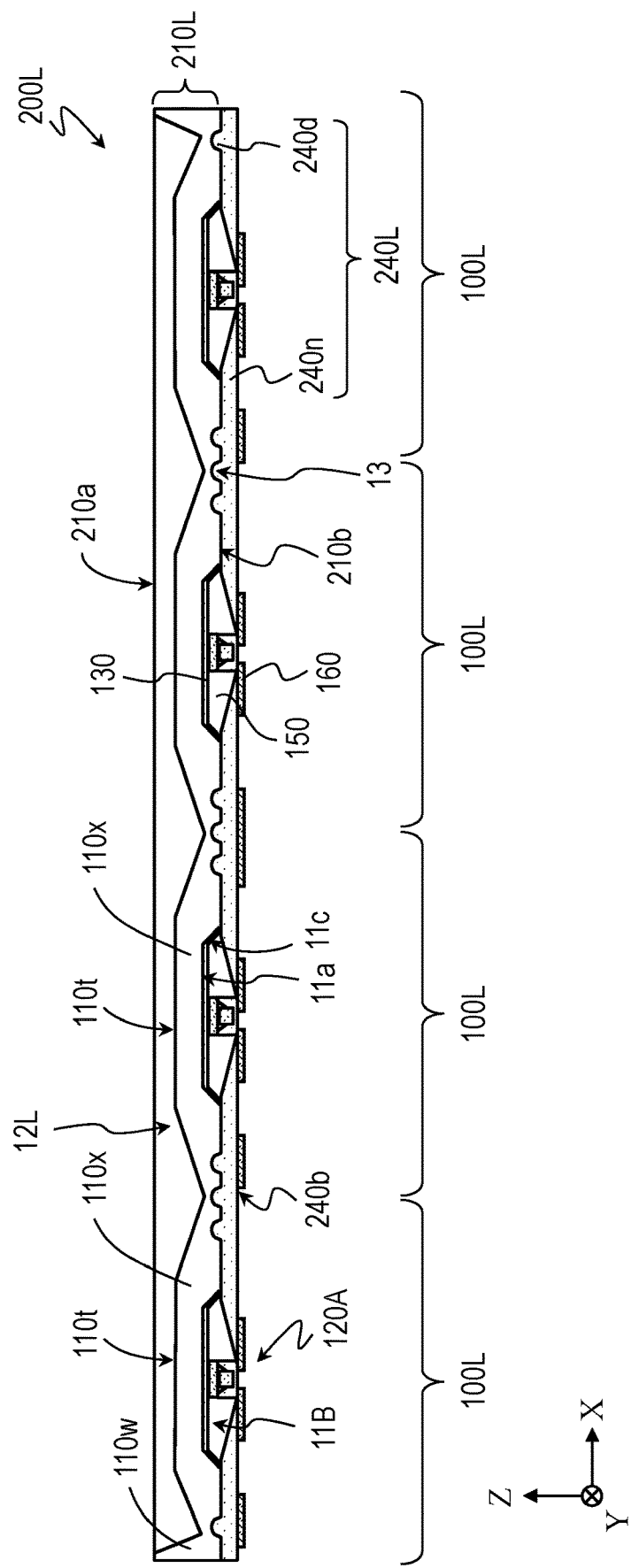
FIG. 26 is a schematic cross-sectional view of the light-emitting module shown in FIG. 25 taken along line C-C.

FIG. 26 schematically shows a cross section of the light-emitting module shown in FIG. 25 taken along line C-C. The lightguide plate 210L has first hole portions 11B on the lower surface 210*b* side as does the lightguide plate 110B in the example shown in FIG. 20, FIG. 21, FIG. 22, FIG. 23 and FIG. 24. Each of the plurality of light sources 120A is provided in a corresponding one of the first hole portions 11B.

Herein, the lightguide plate 210L has a second hole portion 12L on the upper surface 210*a* side that is opposite to the lower surface 210*b*. As shown in FIG. 26, the second hole portion 12L extends across the plurality of light-emitting units 100L. Inside the second hole portion 12L, truncated cone portions 110*x* are provided so as to correspond to the respective light-emitting units 100L. Note that, however, the wall portion 110*w* is not provided in each of the light-emitting units 100L but selectively provided in a peripheral portion of the lightguide plate 210L.

Figure 27:
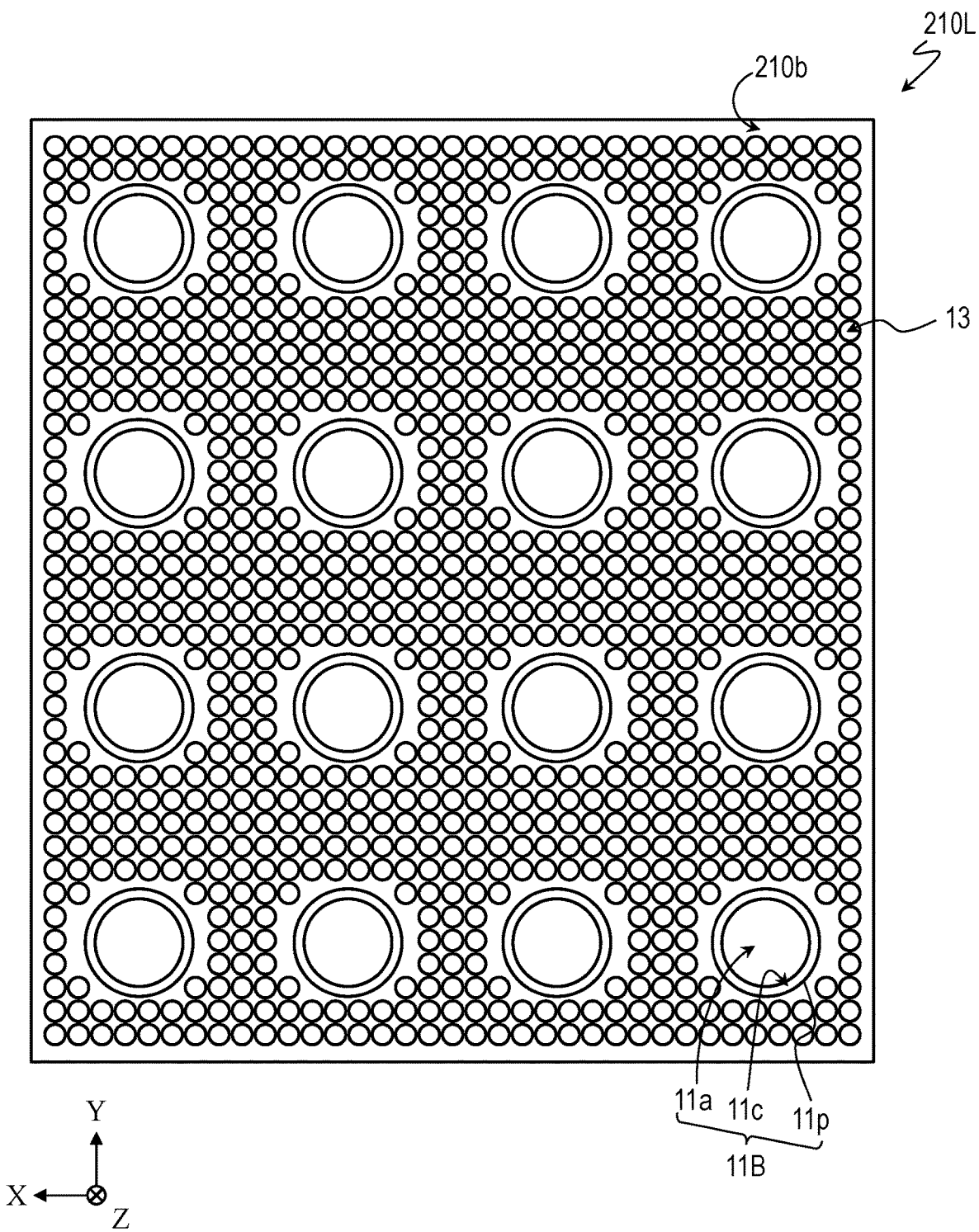
FIG. 27 shows a schematic external appearance of a lightguide plate taken out of the light-emitting module shown in FIG. 25 and FIG. 26 as viewed from the lower surface side.

FIG. 27 shows a schematic external appearance of a lightguide plate taken out of the light-emitting module shown in FIG. 25 and FIG. 26 as viewed from the lower surface side. As shown in FIG. 27, the lower surface 210*b* of the lightguide plate 210L has a plurality of recessed portions 13 in addition to the plurality of first hole portions 11B. In this example, the plurality of recessed portions 13 are provided in an approximate entirety of the lower surface 210*b* of the lightguide plate 210L exclusive of the regions of the first hole portions 11B. In other words, as viewed in cross section, these recessed portions 13 are located between two adjoining first hole portions 11B or between the outer edge of the lightguide plate 210L and the first hole portions 11B.

In the present embodiment, each of the recessed portions 13 has a hemispherical shape. The radius of the hemispherical shape of the recessed portions 13 can be substantially equal to the distance from the lower surface 210*b* of the lightguide plate 210L to the bottom surface 11*a* of the first hole portions 11B in Z direction, for example, about 250 μm.

Refer again to FIG. 26. The light-emitting module 200L of the present embodiment includes a light-reflective member 240L on the lower surface 210*b* side of the lightguide plate 210L. As shown in FIG. 26, the light-reflective member 240L is substantially in the shape of a layer. In the configuration illustrated in FIG. 26, the light-reflective member 240L includes a basal portion 240*n* which is in the shape of a layer and raised portions 240*d* located inside the recessed portions 13 of the lightguide plate 210L. In comparison with the light-reflective member 140B that has previously been described with reference to FIG. 20, the light-reflective member 240L does not have a wall portion 140*w* which demarcates the light-emitting units 100L. When the description is focused on the lightguide plate 210L in comparison with the previously-described lightguide plates, it can be said that the lightguide plate 210L of the present embodiment has a plurality of recessed portions 13 in the lower surface 210b instead that the lower surface has a groove in which the light-reflective wall portion 140w is to be placed.

Instead of providing grooves of a V-shape cross section at the boundaries of the plurality of light-emitting units in a lattice arrangement in the top view, providing a plurality of recessed portions 13 each of which has, for example, a hemispherical shape in the lower surface 210b of the lightguide plate 210L enables the surfaces of the recessed portions 13 to function as reflecting surfaces. That is, the traveling direction of a portion of light emitted from the light source 120A and diffused across the plane of the lightguide plate 210L can be changed by reflection of recessed portions 13 such that the reflected light travels in a direction toward the upper surface 210a of the lightguide plate 210L. As a result, excessive decrease in luminance near the boundaries of the light-emitting units 100L which is attributed to increase in distance from the light source 120A can be suppressed. Because the reflection by the plurality of recessed portions 13 is utilized, advantage can be achieved that luminance non-uniformity in a lattice pattern attributed to excessive increase in luminance near the boundaries is unlikely to occur as compared with a case where a linear reflecting structure is provided at the boundaries of the light-emitting units. Although not shown in FIG. 26, a light diffuser sheet 230 may be provided on or above the upper surface 210a of the lightguide plate 210L likewise as in the example previously described with reference to FIG. 21 and FIG. 22.

As the material of the light-reflective member 240L, a light-reflective resin material can be used which contains titanium dioxide particles, or the like, dispersed in a base material such as silicone resin, likewise as in the above-described light-reflective members 140A, 140B. Particularly in this example, because the raised portions 240d of the light-reflective member 240L is provided in the plurality of recessed portions 13 of the lightguide plate 210L, light can be more effectively reflected at the hemispherical interface between the lightguide plate 210L and the light-reflective member 240L.

The arrangement and density of the plurality of recessed portions 13 provided in the lower surface 210b of the lightguide plate 210L are not limited to the example shown in FIG. 27 but can be appropriately changed according to desired optical characteristics. The shape of each of the recessed portions 13 is not limited to a hemispherical shape but can be any other shape such as hemiellipsoid. It is not essential that all of the plurality of recessed portions 13 have a common shape. Recessed portions of different shapes may be provided together in the lower surface 210b of the lightguide plate 210L.

Figure 28:
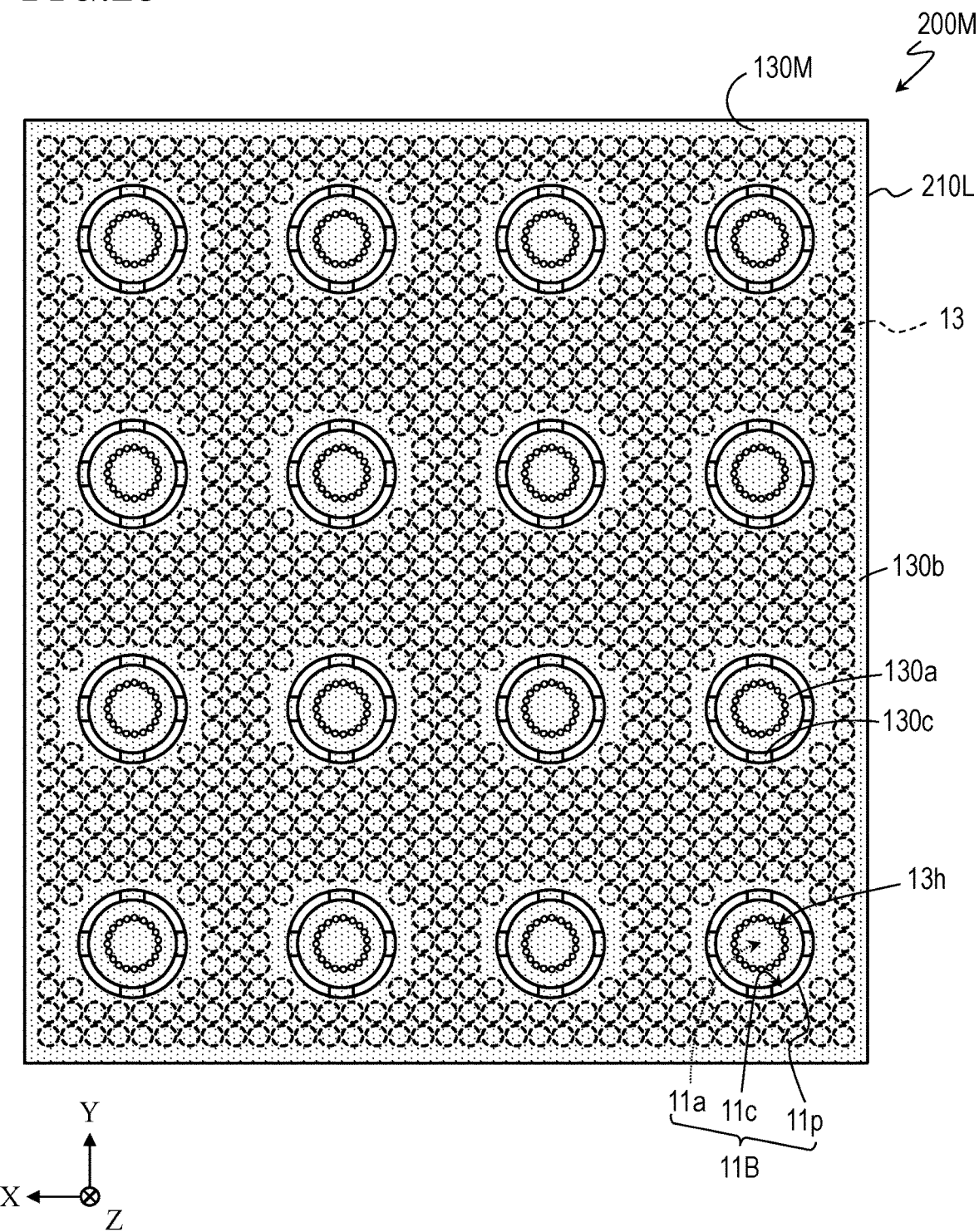
FIG. 28 is a schematic bottom view of a light-emitting module according to still another embodiment of the present disclosure.

FIG. 28 shows still another embodiment of the light-emitting module. A major difference between the light-emitting module 200M shown in FIG. 28 and the light-emitting module 200L that has previously been described with reference to FIG. 25, FIG. 26 and FIG. 27 resides in that the light-emitting module 200M includes a single light diffusing layer 130M extending across the plurality of light-emitting units 100L instead of providing a light diffusing layer 130 for each of the light-emitting units 100L. The light-emitting module 200M is the same as the above-described light-emitting module 200L in that it includes the lightguide plate 210L. For the sake of convenience in description, FIG. 28 schematically shows an external appearance of the lightguide plate 210L and the light diffusing layer 130M taken out of the light-emitting module 200M as viewed from the side opposite to the upper surface 210a of the lightguide plate 210L.

In the present embodiment, the light diffusing layer 130M of the light-emitting module 200M further includes a third portion 130b which covers the lower surface 210b of the lightguide plate 210L exclusive of the first hole portions 11B in addition to the first portions 130a located on respective bottom surfaces 11a of the first hole portions 11B and a plurality of second portions 130c which respectively cover part of the lateral surfaces 11c of the first hole portions 11B. In other words, the light diffusing layer 130M covers an approximate entirety of the lightguide plate 210L on the lower surface 210b side exclusive of part of the lateral surfaces 11c of the first hole portions 11B.

The light diffusing layer 130M of the light-emitting module 200M is, for example, formed of a resin in which a light-reflective filler is dispersed as is the above-described light diffusing layer 130. The light diffusing layer 130M which is arranged so as to cover an approximate entirety of the lightguide plate 210L on the lower surface 210b side enables light traveling toward the lower surface 210b in the lightguide plate 210L to be effectively reflected toward the upper surface 210a and contributes to improvement in light extraction efficiency. Particularly, in this example, the third portion 130b of the light diffusing layer 130M is also provided inside the recessed portions 13 of the lightguide plate 210L, so that decrease in luminance near the boundaries of the light-emitting units can be effectively suppressed.

Each first portion 130a of the light diffusing layer 130M can have circular openings 13h likewise as in the example that has previously been described with reference to FIG. 22. In the example shown in FIG. 28, a plurality of openings 13h, each of which has a circular shape, are provided in the first portion 130a in an annular arrangement.

The third portion 130b of the light diffusing layer 130M may be selectively provided inside the recessed portions 13 of the lightguide plate 210L instead of arranging the third portion 130b so as to cover an approximate entirety of the lower surface 210b of the lightguide plate 210L exclusive of the first hole portions 11B. The third portion 130b may be provided concurrently with the first portions 130a and the second portions 130c inside the first hole portions 11B in the same step or may be provided in a separate step. The material of the light diffusing layer 130M is not limited to a light-reflective resin material. The light diffusing layer 130M may be a reflecting film of a metal or the like or a multilayer dielectric film.

Figure 29:
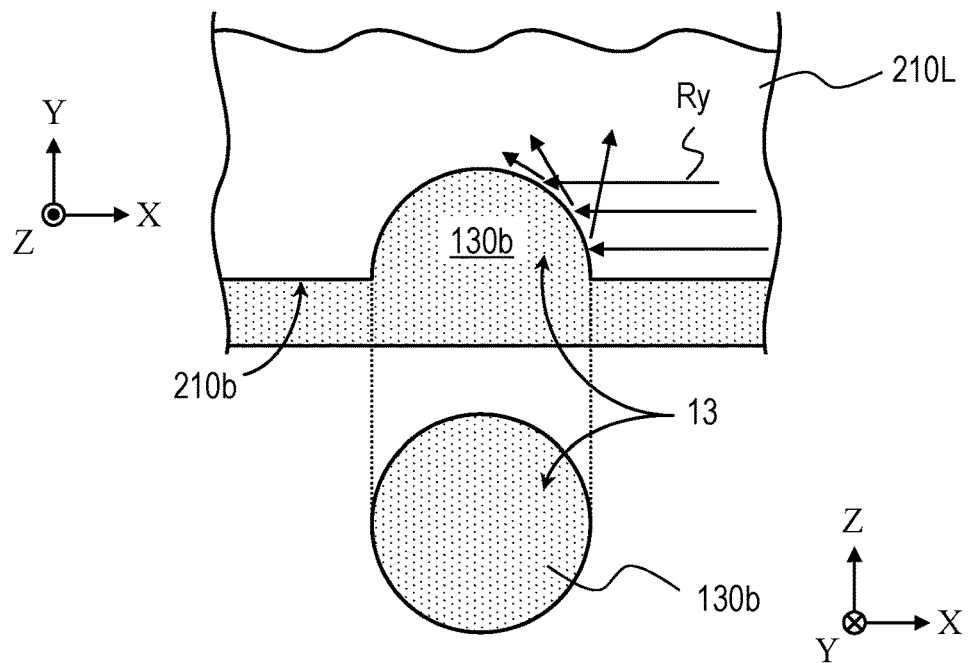
FIG. 29 schematically shows an enlarged view of a portion near a recessed portion located on the lower surface side of the lightguide plate.

FIG. 29 schematically shows an enlarged view of a portion near a recessed portion located on the lower surface side of the lightguide plate. In the configuration example shown in FIG. 29, the third portion 130b of the light diffusing layer 130M is provided inside the recessed portion 13 so as to cover the entirety of the inner surface that defines the hemispherical shape of the recessed portion 13 provided in the lower surface 210b of the lightguide plate 210L. FIG. 29 shows, together in a single drawing, a cross section of the lightguide plate 210L taken along a plane perpendicular to the lower surface 210b of the lightguide plate 210L and a recessed portion 13 as viewed in a direction normal to the lower surface 210b. As schematically represented by solid arrows Ry in FIG. 29, light emitted from a light source 120A provided in a first hole portion 11B and traveling toward the recessed portion 13 in the same light-emitting unit is reflected at the interface between the lightguide plate 210L and the third portion 130b of the light diffusing layer 130M so as to travel toward the upper surface 210a of the lightguide plate 210L. That is, the inner surface of the recessed portion 13 can serve as a curved mirror.

Figure 30:
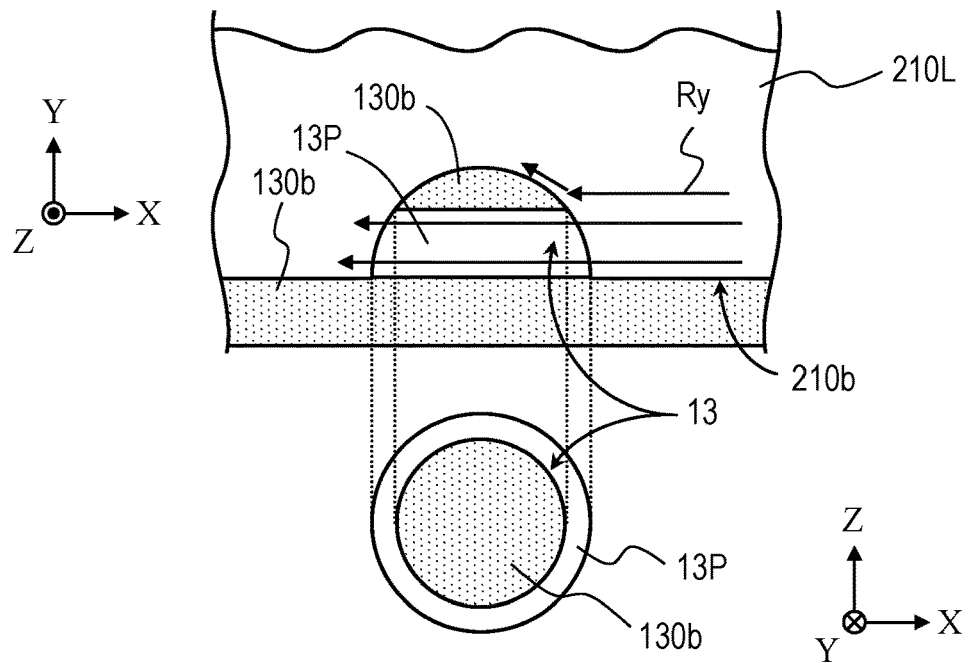
FIG. 30 schematically shows another example of a recessed portion located on the lower surface side of the lightguide plate and a light diffusing layer.

FIG. 30 shows another configuration example of a recessed portion located on the lower surface side of the lightguide plate and a light diffusing layer. In FIG. 30, the third portion 130b of the light diffusing layer 130M does not cover the entirety of the inner surface of the recessed portion 13 but is provided in part of the inside of the recessed portion 13. In this example, the third portion 130b of the light diffusing layer 130M is selectively provided near the apex (i.e., the "highest point") of the hemispherical recessed portion 13.

The third portion 130b of such a shape can be realized by selectively applying a resin material in which, for example, a light-reflective filler is dispersed to a portion of the recessed portion 13 near the apex by inkjet printing or the like and curing the applied resin material. Alternatively, the third portion 130b can also be realized by forming a reflecting film such as metal film on the lower surface 210b of the lightguide plate 210L and the inner surface of the recessed portion 13 by plating or the like and thereafter removing unnecessary parts of the reflecting film.

When the third portion 130b of the light diffusing layer 130M is provided in part of the inside of the recessed portion 13, such an effect can be achieved as if there is a mirror floating inside the recessed portion 13. The other part of the inside space of the recessed portion 13 in which the third portion 130b is not present may be hollow or may be filled with a resin or the like. Herein, the part of the inside space of the recessed portion 13 in which the third portion 130b is not present may be filled with a light-transmitting resin 13P. In this case, if the resin 13P is a resin material whose refractive index is close to that of the material of the lightguide plate 210L, a portion of light traveling toward the recessed portion 13 which enters a portion other than the part that serves as a mirror can be transmitted therethrough.

Figure 31:
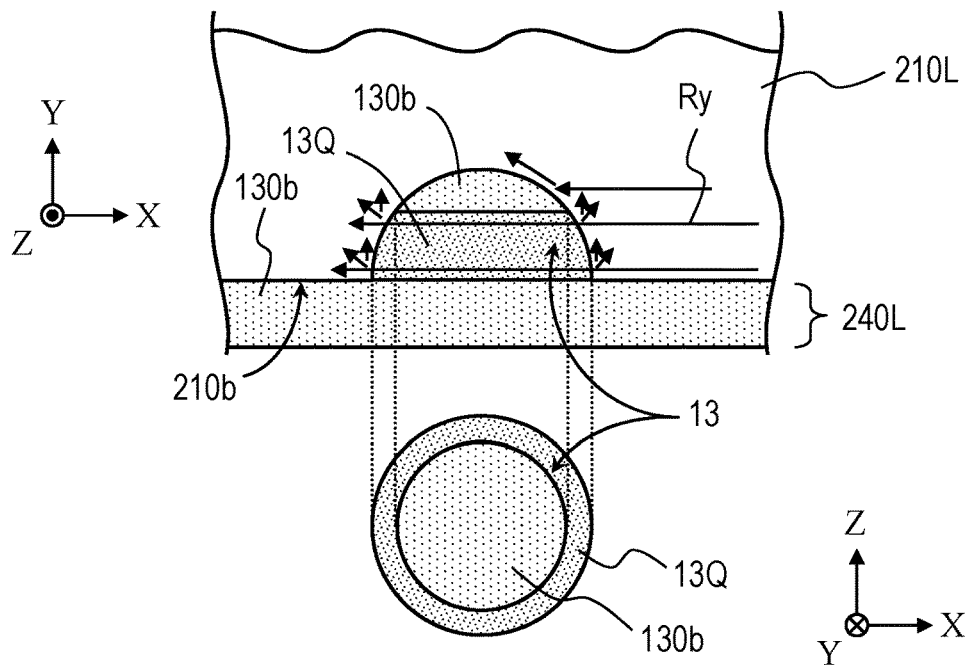
FIG. 31 schematically shows still another configuration example of a recessed portion located on the lower surface side of the lightguide plate and a light diffusing layer.

FIG. 31 shows still another configuration example of a recessed portion located on the lower surface side of the lightguide plate and a light diffusing layer. In comparison with the example that has previously been described with reference to FIG. 30, the example of FIG. 31 is configured such that part of the space inside the recessed portion 13 in which the third portion 130b is not present is filled with a light-transmitting resin 13Q. The resin 13Q contains a wavelength converting substance such as phosphor particles.

The phosphor contained in the resin 13Q can be the same as that dispersed in the above-described light-transmitting member 22. For example, a YAG-based phosphor which is capable of converting blue light to yellow light can be dispersed in the resin 13Q. When the light-emitting element 120 of the light source 120A is a LED which is capable of emitting blue light, light which enters the recessed portion 13 contains a large blue component. If, for example, a YAG-based phosphor is dispersed in the resin 13Q, the blue light which enters the resin 13Q excites the phosphor such that yellow light can exit from the resin 13Q. That is, the color of light exiting from the upper surface 210a of the lightguide plate 210L can be modified such that the light has a longer wavelength.

Figure 32:
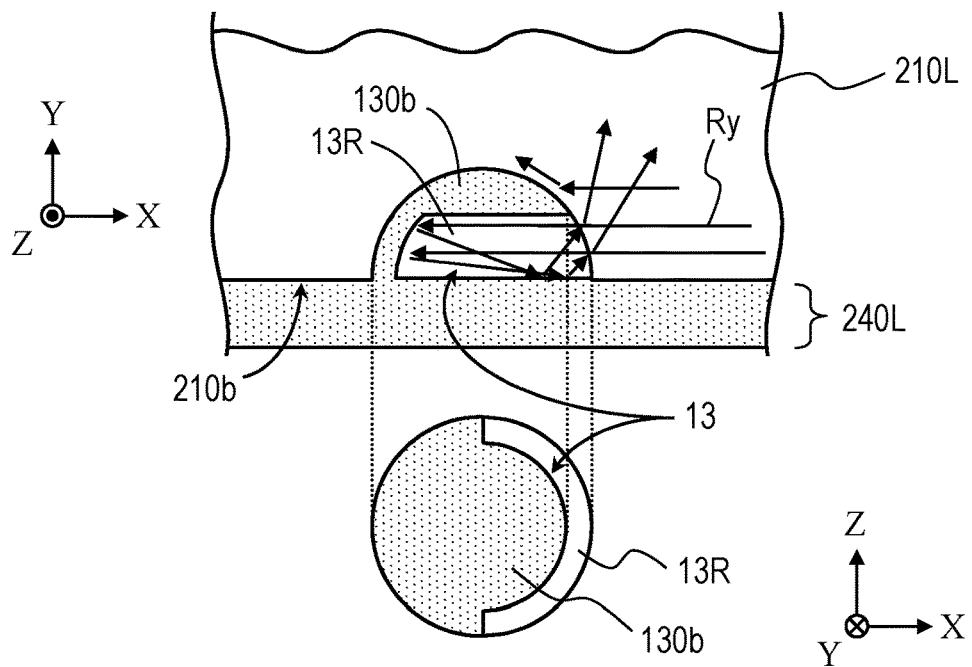
FIG. 32 schematically shows still another example of a recessed portion located on the lower surface side of the lightguide plate and a light diffusing layer.

FIG. 32 shows still another configuration example of a recessed portion located on the lower surface side of the lightguide plate and a light diffusing layer. In the example of FIG. 32, the inner surface of the recessed portion 13 exclusive of a portion closer to the light source 120A is covered with the third portion 130b. Herein, part of the space inside the recessed portion 13 in which the third portion 130b is not present is filled with a light-transmitting resin 13R. When the material of the resin 13R has a higher refractive index than the material of the lightguide plate 210L, the traveling direction of light can be changed to a direction toward the upper surface 210a of the lightguide plate 210L as schematically represented by solid arrows Ry in FIG. 32 due to reflection inside the recessed portion 13 and refraction at the interface between the resin 13R and the lightguide plate 210L.

Figure 33:
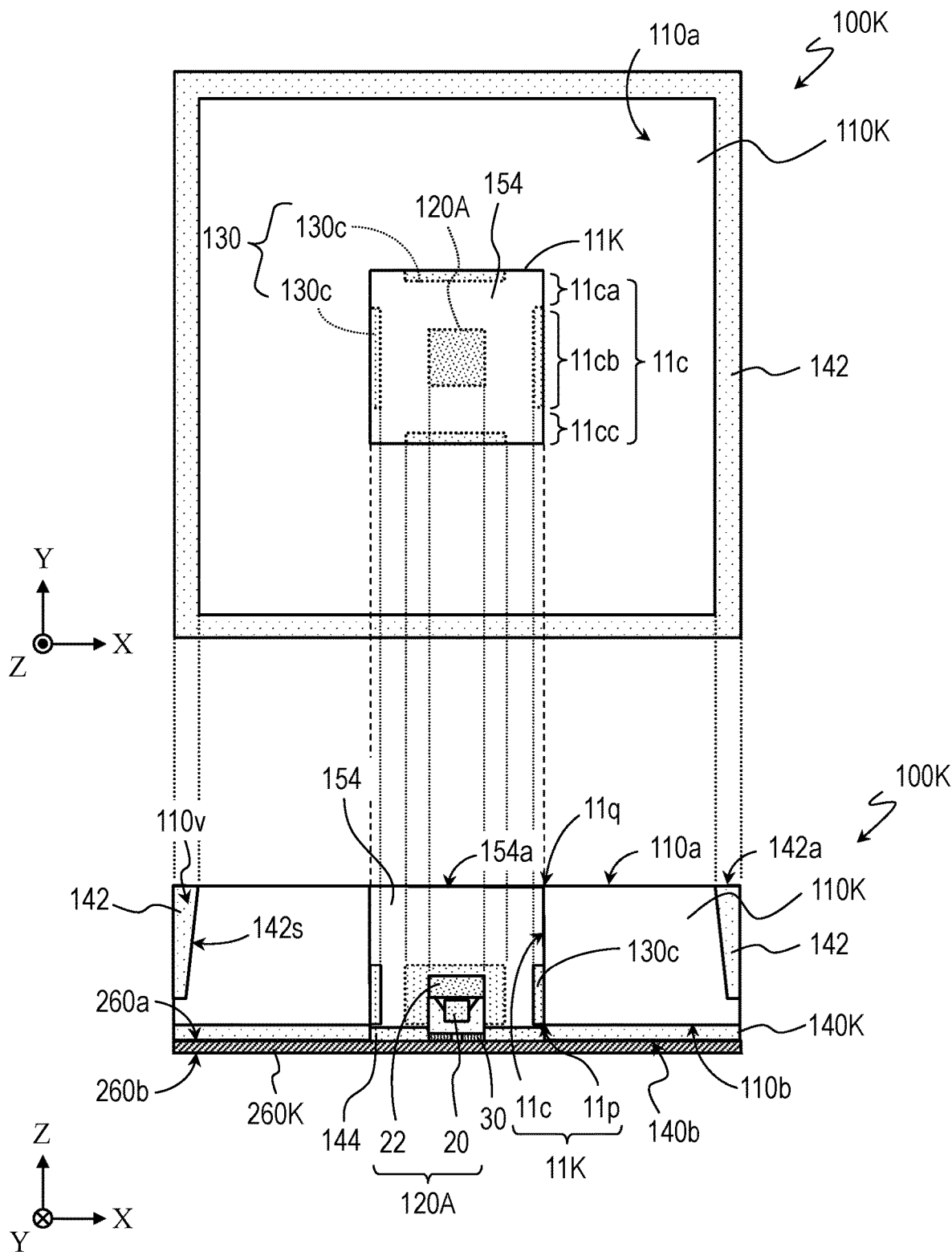
FIG. 33 schematically shows a light-emitting module according to still another embodiment of the present disclosure.

FIG. 33 schematically shows a light-emitting module of still another embodiment of the present disclosure. The light-emitting unit 100K shown in FIG. 33 is still another example of the light-emitting units 100 that have previously been described with reference to FIG. 1. FIG. 33 schematically shows, as FIG. 20 does, together in a single drawing, an external appearance of the light-emitting unit 100K as viewed from the upper surface 210a side of the lightguide plate 210 and a cross section of the light-emitting unit 100K taken along a plane perpendicular to the upper surface 210a of the lightguide plate 210 near the center of the light-emitting unit 100K.

The light-emitting unit 100K shown in FIG. 33 includes a lightguide plate 110K having a first hole portion 11K, a light source 120A which is present inside the first hole portion 11K in the top view, and a light diffusing layer 130 provided on the lateral surfaces 11c of the first hole portion 11K. In the configuration illustrated in FIG. 33, the first hole portion 11K, which is in the form of a through hole extending between the upper surface 110a and the lower surface 110b of the lightguide plate 110K, is provided in the lightguide plate 110K.

In this example, the first hole portion 11K is a through hole in the shape of a quadrangular prism. The first hole portion 11K has a rectangular opening 11q located at the upper surface 110a of the lightguide plate 110K, a rectangular opening 11p located at the lower surface 110b of the lightguide plate 110K, and four lateral surfaces 11c which are present between the opening 11p and the opening 11q. As a matter of course, the specific shape of the through hole of the first hole portion 11K is not limited to this example but may be a polygonal prism shape other than quadrangular prism, a circular cylinder shape, an elliptical cylinder shape, or the like. The shape of the opening 11q on the upper surface 110a side and the shape of the opening 11p on the lower surface 110b side do not need to be identical or similar. The lateral surfaces 11c of the first hole portion 11K may be inclined with respect to a plane perpendicular to the upper surface 110a of the lightguide plate 110K.

As previously described, in the configuration illustrated in FIG. 33, the first hole portion 11K of the lightguide plate 110K is a through hole penetrating through the lightguide plate 110K. Therefore, in this example, the light diffusing layer 130 does not include the above-described first portion 130a but includes four second portions 130c in total which cover part of the respective lateral surfaces 11c. Herein, each of the four lateral surfaces 11c includes a first region 11ca, a second region 11cb and a third region 11cc, which are aligned along one side of the rectangular shape of the opening 11p (or opening 11q). As shown in the upper part of FIG. 33, the second portions 130c of the light diffusing layer 130 are selectively provided on the second region 11cb located between the first region 11ca and the third region 11cc. Thus, likewise as in the previously-described examples, the amount of light arriving at the corners of the rectangular shape of the lightguide plate 110K can be increased while increase in luminance is suppressed near the middle of the sides of the rectangular shape of the lightguide plate 110K at which the distance from the light source 120A is relatively small.

Particularly, in this example, as shown in the lower part of FIG. 33, the light diffusing layer 130 is selectively provided at a position in each of the lateral surfaces 11c where the opening 11p on the lower surface 110b side is closer. In other words, in this example, the light diffusing layer 130 is provided at lower part of the through hole. In the configuration illustrated in FIG. 33, the light source 120A is located closer to the opening 11p on the lower surface 110b side than the opening 11q on the upper surface 110a side of the lightguide plate 110K. Therefore, the lower part of the through hole is more intensely irradiated with the light source 120A. From the viewpoint of improving the uniformity of light on the upper surface 110a side of the lightguide plate 110K, it is advantageous that, as in this example, the light diffusing layer 130 is selectively provided on part of the lateral surfaces 11c of the first hole portion 11K where the light from the light source 120A is more intensely irradiated with. Note that, however, it is not essential to selectively provide the light diffusing layer 130 at lower part of the through hole. The light diffusing layer 130 may be provided on the lateral surfaces 11c of the first hole portion 11K so as to extend across the entirety in depth direction (herein, Z direction) of the through hole, i.e., from the opening 11p to the opening 11q.

In the configuration illustrated in FIG. 33, the light-emitting unit 100K includes a light-reflective member 140K in the form of a layer, a light-reflective member 142 formed along the outer edge of the lightguide plate 110K, and a wiring board 260K. The light-reflective member 140K and the wiring board 260K are located on the lower surface 110b side of the lightguide plate 110K. The light-reflective member 140K covers an approximate entirety of the lower surface 110b of the lightguide plate 110K.

The light-reflective member 140K can be formed of a light-reflective resin material by injection molding, transfer molding, or the like, as is the above-described light-reflective member 140A. The material of the light-reflective member 140K can be a resin material in which silicon oxide particles as a light-reflective filler are dispersed in a base material such as silicone resin, or the like, likewise as in the light diffusing layer 130. Alternatively, the light-reflective member 140K can also be formed by preparing a light-reflective resin sheet using polyethylene terephthalate (PET) or the like as the base material, which has a through hole at a position corresponding to the first hole portion 11K of the lightguide plate 110K, and bonding the resin sheet to the lower surface 110b of the lightguide plate 110K using an adhesive sheet or the like.

In the example shown in FIG. 33, the lightguide plate 110K has a groove 110v extending along the outer edge of the rectangular shape, and the light-reflective member 142 is located inside the groove 110v. The light-reflective member 142 is formed of, for example, the same material as that of the above-described light diffusing layer 130. Therefore, the light-reflective member 142 carries out the same or a similar function as that of the wall portion 140w of the light-reflective member 140A.

Herein, the groove 110v is provided continuously along the four sides of the rectangular shape of the lightguide plate 110K. Thus, at the upper surface 210a of the lightguide plate 210 (see FIG. 1), the upper surface 142a of the light-reflective member 142 appears in the shape of a lattice. The groove 110v may be provided in the lightguide plate 110K continuously along the four sides of the rectangular shape of the lightguide plate 110K or may include a plurality of portions which are arranged so as to surround the light source 120A in the top view.

In this example, the interface between the lightguide plate 110K and the light-reflective member 142 forms a slope surface 142s which is inclined with respect to a plane perpendicular to the upper surface 110a of the lightguide plate 110K. The specific shape of the groove 110v of the lightguide plate 110K is not limited to the example shown in FIG. 33 but may be a V-groove, or may be a U-groove, etc. The groove 110v may be provided in the lightguide plate 110K so as to penetrate through the lightguide plate 110K from the upper surface 110a to the lower surface 110b.

The wiring board 260K is bonded to the lower surface 140b of the light-reflective member 140K by an adhesive sheet or the like. A typical example of the wiring board 260K is a flexible printed circuit (FPC) board. The FPC includes an insulative support in the form of a film and an wiring layer formed of, for example, copper. Examples of the material of the support of the wiring board 260K include phenolic resins, epoxy resins, polyimide resins, BT resins, polyphthalamide (PPA), polyethylene terephthalate (PET), etc.

The wiring board 260K includes a plurality of wiring layers including, for example, a first wiring layer located on the upper surface 260a side which faces the lower surface 140b of the light-reflective member 140K and a second wiring layer located on the lower surface 260b side which is opposite to the upper surface 260a. The second wiring layer is connected to an external circuit such as driver. The first wiring layer is electrically coupled with the second wiring layer through, for example, the via inside the wiring board 260K.

The light source 120A is electrically and physically connected to the first wiring layer by a bonding member 30 such as solder. As shown in FIG. 33, the light source 120A is supported by the wiring board 260K and is present inside the first hole portion 11K of the lightguide plate 110K. As a matter of course, any of the above-described light sources 120C to 120E can be used in place of the light source 120A.

In this example, a second light-transmitting member 154 is provided in the inside of the first hole portion 11K. The second light-transmitting member 154 is formed of a resin material, such as silicone resin, as is the above-described second light-transmitting member 150. Herein, the upper surface 154a of the second light-transmitting member 154 is substantially coplanar with the upper surface 110a of the lightguide plate 110K. The upper surface 154a of the second light-transmitting member 154 may be flat or may have curvature.

In this example, a light-reflective member 144 in the form of a layer is provided in a region of the upper surface 260a of the wiring board 260K where the first hole portion 11K overlaps. The light-reflective member 144 is formed of, for example, the same material as that of the above-described light diffusing layer 130. When the light-reflective member 144 is provided on the wiring board 260K, light emitted from the light source 120A and traveling toward the wiring board 260K can be reflected toward the upper surface 110a of the lightguide plate 110K, so that the light extraction efficiency can be improved.

The embodiments of the present disclosure are useful in various types of light sources for lighting, on-vehicle light sources, display light sources, etc. Particularly, the embodiments of the present disclosure are advantageously applicable to backlight units for liquid crystal display devices.

The light-emitting module or surface-emission light source according to the embodiments of the present disclosure may suitably be used in backlights for display devices of mobile devices, for which there are strong demands for reducing the thickness, surface-emitting devices that are capable of local dimming, etc.

While certain embodiments of the present invention have been described with respect to exemplary embodiments thereof, it will be apparent to those skilled in the art that the disclosed invention can be modified in numerous ways and can assume many embodiments other than those specifically described above. Accordingly, it is intended by the appended claims to cover all modifications of the invention that fall within the true spirit and scope of the invention.

What is claimed is:

1. A light-emitting module comprising a two-dimensional array of a plurality of light-emitting units, each of the light-emitting units comprising:
   a lightguide plate having a first surface, the lightguide plate having a first hole portion that defines at least one lateral surface and an opening at the first surface,
   a light source provided at least partially inside the first hole portion, the light source comprising a light-emitting element, and
   a light diffusing layer covering part of the at least one lateral surface of the first hole portion,
   wherein the light-emitting units each have a rectangular external shape in a top view, and
   wherein the light diffusing layer does not cover part of the at least one lateral surface of the first hole portion where a diagonal line of the rectangular shape of the light-emitting unit is present.

2. The light-emitting module of claim 1, wherein the light diffusing layer has a rotationally symmetrical shape in a top view.

3. The light-emitting module according to claim 2, wherein the first hole portion is a through hole penetrating through the lightguide plate.

4. The light-emitting module according to claim 1 wherein
   the first hole portion is a recessed portion having the at least one lateral surface, and a bottom surface, the bottom surface having a rectangular shape in the top view,
   the at least one lateral surface of the first hole portion includes four slope surfaces each inclined with respect to the first surface of the lightguide plate,
   each of the slope surfaces includes a first region, a second region and a third region that are arranged along a side of the rectangular shape of the bottom surface,
   the second region is present between the first region and the third region, and
   the light diffusing layer selectively covers the second region.

5. The light-emitting module according to claim 4, wherein the light diffusing layer covers all or part of the bottom surface of the first hole portion.

6. The light-emitting module according to claim 1, wherein
   the first hole portion is a recessed portion having the at least one lateral surface and a bottom surface, and
   the light diffusing layer covers all or part of the bottom surface of the first hole portion.

7. The light-emitting module according to claim 5, wherein the light diffusing layer has a plurality of openings each penetrating through the light diffusing layer from a surface which faces the bottom surface of the first hole portion to a surface located at a side at which the light source is located.

8. The light-emitting module according to claim 5, wherein
   the lightguide plate comprises, inside the first hole portion, a plurality of pillars projecting from the bottom surface of the first hole portion, and
   the light diffusing layer covers the bottom surface of the first hole portion exclusive of regions of the plurality of pillars.

9. The light-emitting module according to claim 4, wherein the light source includes a wavelength conversion member interposed between the light-emitting element and the bottom surface of the first hole portion.

10. The light-emitting module according to claim 4, wherein
    the lightguide plate has a second surface located opposite to the first surface, and
    the second surface of the lightguide plate has a second hole portion located opposite to the first hole portion.

11. The light-emitting module according to claim 10, wherein
    the light-emitting element comprises an electrode on a side opposite to the bottom surface of the first hole portion, and
    each of the light-emitting units further comprises a light-reflective member located at a side closer to the first surface of the lightguide plate, the light-reflective member covering a region exclusive of the electrode.

12. The light-emitting module according to claim 11, wherein the light-reflective member has a wall portion projecting in a direction from the first surface side toward the second surface side, the wall portion having a slope surface that surrounds the first hole portion.

13. The light-emitting module according to claim 11, further comprising a wiring layer located on the light-reflective member, the wiring layer being electrically connected with the electrode.

14. The light-emitting module according to claim 1, wherein the first hole portion is a through hole penetrating through the lightguide plate.

15. A surface-emission light source comprising a two-dimensional array of a plurality of light-emitting modules, each of the light-emitting modules being the light-emitting module according to claim 1.

16. The light-emitting module according to claim 2, wherein
    the first hole portion is a recessed portion having the at least one lateral surface, and a bottom surface, the bottom surface having a rectangular shape in the top view,
    the at least one lateral surface of the first hole portion includes four slope surfaces each inclined with respect to the first surface of the lightguide plate,
    each of the slope surfaces includes a first region, a second region and a third region that are arranged along a side of the rectangular shape of the bottom surface,
    the second region is present between the first region and the third region, and
    the light diffusing layer selectively covers the second region.

17. The light-emitting module according to claim 16, wherein the light diffusing layer covers all or part of the bottom surface of the first hole portion.

* * * * *